April 5, 1966 H. J. OGUEY 3,244,901
BINARY INFORMATION TRANSFER DEVICE
Filed Feb. 7, 1961

April 5, 1966     H. J. OGUEY     3,244,901
BINARY INFORMATION TRANSFER DEVICE
Filed Feb. 7, 1961     16 Sheets-Sheet 5

April 5, 1966  H. J. OGUEY  3,244,901
BINARY INFORMATION TRANSFER DEVICE
Filed Feb. 7, 1961  16 Sheets-Sheet 6
FIG. 10d
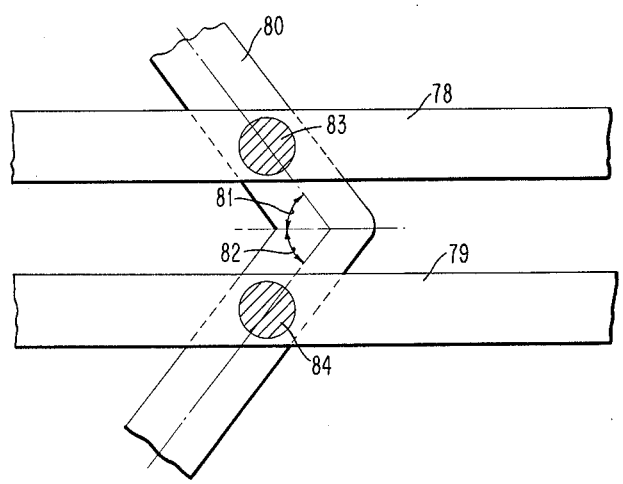
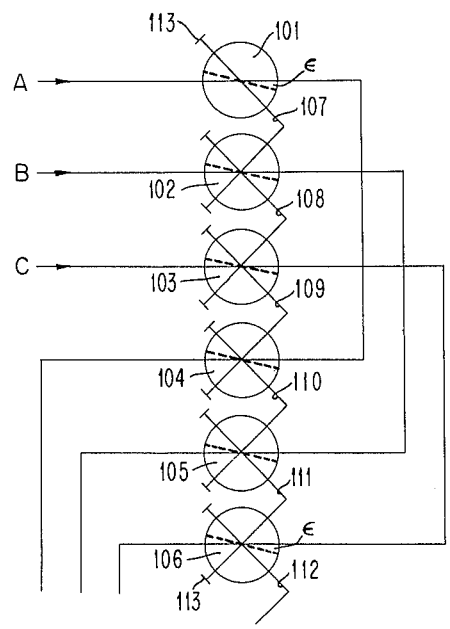
----- EASY DIRECTION
FIG. 11

April 5, 1966 H. J. OGUEY 3,244,901
BINARY INFORMATION TRANSFER DEVICE
Filed Feb. 7, 1961 16 Sheets-Sheet 8

--- EASY DIRECTION

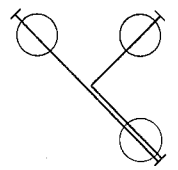 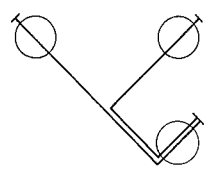 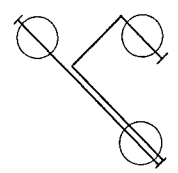 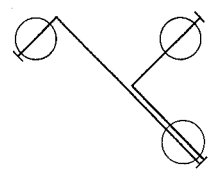
FIG. 20a  FIG. 21a  FIG. 22a  FIG. 23a
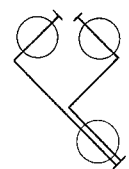 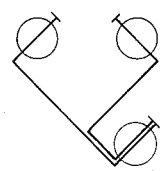 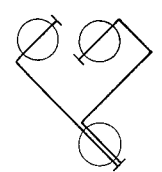 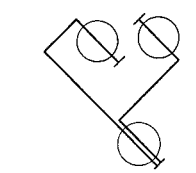
FIG. 20b  FIG. 21b  FIG. 22b  FIG. 23b
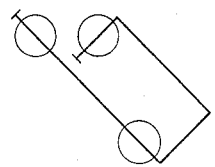 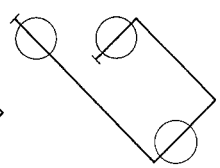 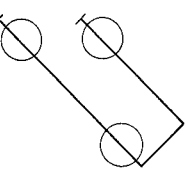 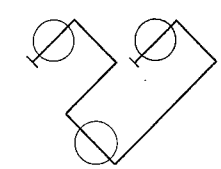
FIG. 20c  FIG. 21c  FIG. 22c  FIG. 23c
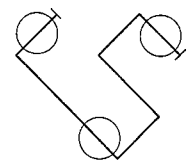 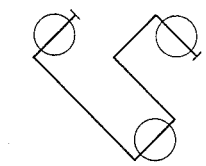 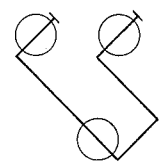 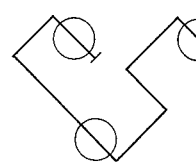
FIG. 20d  FIG. 21d  FIG. 22d  FIG. 23d
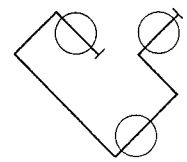 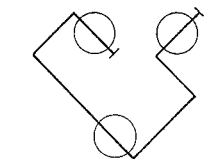 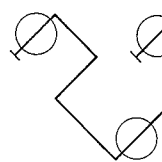 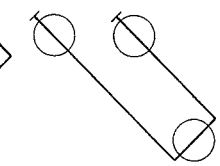
FIG. 20e  FIG. 21e  FIG. 22e  FIG. 23e
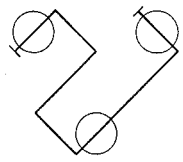 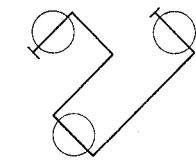 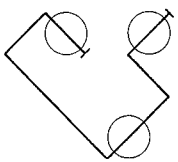 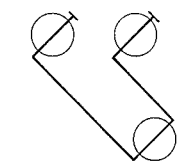
FIG. 20f  FIG. 21f  FIG. 22f  FIG. 23f

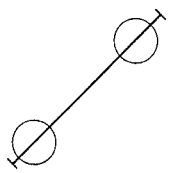 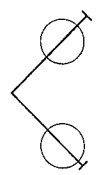 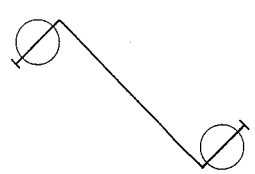 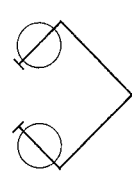
FIG.24a    FIG.24b    FIG.24c    FIG.24d
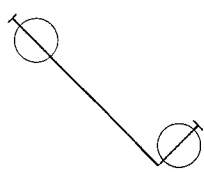 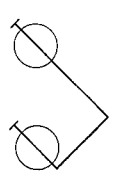 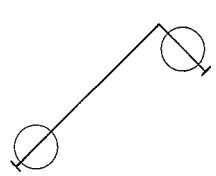 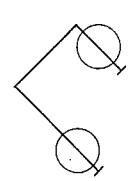
FIG.25a    FIG.25b    FIG.25c    FIG.25d
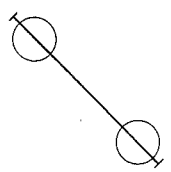 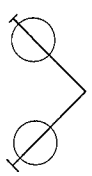 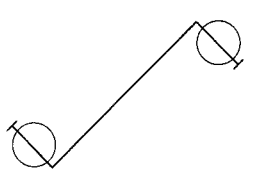 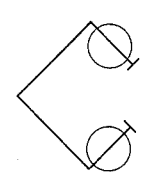
FIG.26a    FIG.26b    FIG.26c    FIG.26d
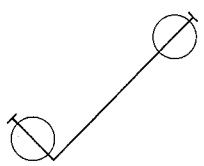 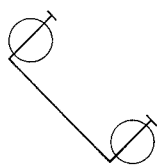 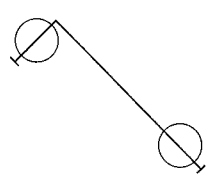 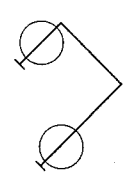
FIG.27a    FIG.27b    FIG.27c    FIG.27d

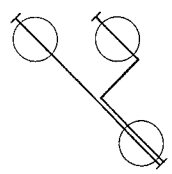 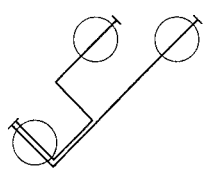 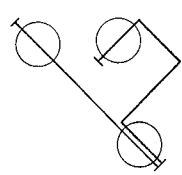 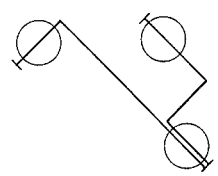
FIG. 32a   FIG. 33a   FIG. 34a   FIG. 35a
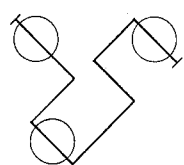 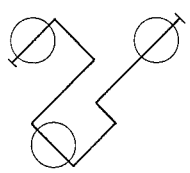 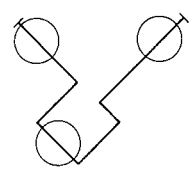 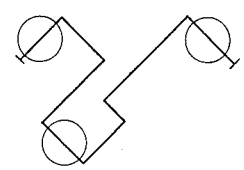
FIG. 32b   FIG. 33b   FIG. 34b   FIG. 35b
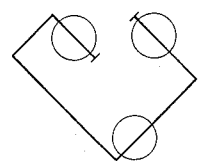 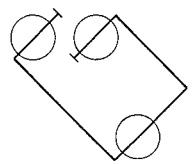 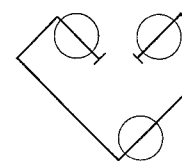 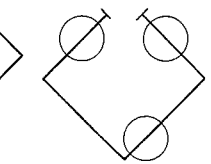
FIG. 32c   FIG. 33c   FIG. 34c   FIG. 35c
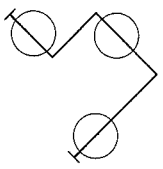 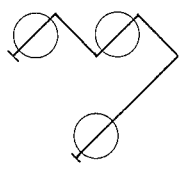 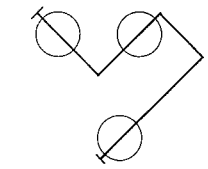 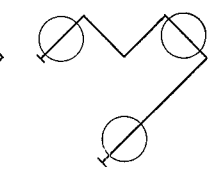
FIG. 32d   FIG. 33d   FIG. 34d   FIG. 35d
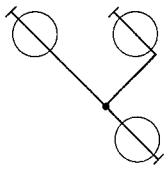 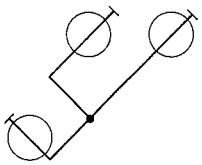 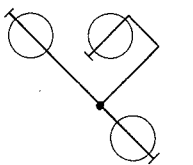 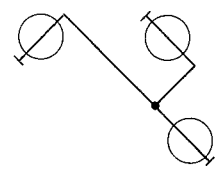
FIG. 32e   FIG. 33e   FIG. 34e   FIG. 35e April 5, 1966   H. J. OGUEY   3,244,901
BINARY INFORMATION TRANSFER DEVICE
Filed Feb. 7, 1961   16 Sheets-Sheet 14

April 5, 1966    H. J. OGUEY    3,244,901
BINARY INFORMATION TRANSFER DEVICE
Filed Feb. 7, 1961    16 Sheets-Sheet 15

April 5, 1966  H. J. OGUEY  3,244,901
BINARY INFORMATION TRANSFER DEVICE
Filed Feb. 7, 1961  16 Sheets-Sheet 16

United States Patent Office 3,244,901
Patented Apr. 5, 1966

3,244,901
BINARY INFORMATION TRANSFER DEVICE
Henri J. Oguey, Lake Mohegan, N.Y., assignor to International Business Machines Corporation, New York, N.Y., a corporation of New York
Filed Feb. 7, 1961, Ser. No. 87,598
Claims priority, application Switzerland, Feb. 9, 1960, 1,412/60
10 Claims. (Cl. 307—88)

This invention relates to a device for transmitting binary information, preferably in electronic digital computers and information processing machines, employing thin magnetic layers as storage and switching elements.

In the endeavor to increase the efficiency of electronic digital computers and information processing machines, in other words, to accelerate the processing speed and the transmission of information, also to improve the reliability of this equipment, it is necessary, from the technical point of view, to develop elements which operate faster and more reliably. Switching elements of thin magnetic layers have been employed recently; these show promise of great success as far as their application in computer circuits is concerned. Thin magnetic films are layers of magnetic material deposited on a substrate and having a thickness of, for example, 100 to 1000 A. (1 A.=$10^{-8}$ cm.), in which certain physical properties not prominent in bulk material can be observed. Although such layers have been known in the sphere of physics for a long time, their application as storage and switching elements in digital computers and information processing machines has not been investigated until quite recently. Although numerous circuits with magnetic elements of bulk materials, for example toroids and transfluxors of ferrites which have proved themselves in computers and data processing machines, are well known in the art, these proven circuits with elements of bulk material cannot be used in the same manner on elements of thin magnetic films, because of the above mentioned divergent physical properties.

The primary reason for this is that the static and dynamic behavior of thin magnetic layers is determined to an advanced degree by the appearance of a uniaxial preferred direction of the magnetization.

This means that the magnetization of the layer endeavors to adjust itself parallel to a definite preferred direction. It is customary to designate this preferred direction as the "easy direction" and the direction perpendicular to this in the plane of the layer as the "hard direction."

Such a magnetic preferred direction in a thin layer can be produced in a number of ways. A conventional method of producing thin layers consists in the evaporation of metal in a high vacuum. With this process, the preferred direction is achieved in the following manner: The metal alloy, for example, permalloy consisting of 80% nickel and 20% iron is heated in a high vacuum at approximately $10^{-6}$ to $10^{-7}$ Torr up to a temperature at which the metal evaporates. The metallic vapor then condenses onto a suitably arranged substrate, e.g. glass and there forms a mirror-like metal layer. When condensation takes place in the presence of a static magnetic field parallel to the layer surface, a preferred direction of magnetization is formed in the magnetic layer, which is parallel to the direction of the static magnetic field. The influence of a number of determining factors is considered for the formation of this preferred direction, including the directional ordering of atom pairs, the formation of a fibre structure in the film, i.e. in the layer, the interstitial oxygen atoms, anisotropic mechanical stresses and presumably a number of additional effects.

The uniaxial preferred direction of the magnetization is referred to as uniaxial magnetic anisotropy. In a thin magnetic layer in conjunction with the high demagnetization at right angles to the plane of the film and the negligible demagnetization in the plane of the layer, this uniaxial magnetic anisotropy conduces to a switching behavior for the magnetization like that encountered in a single domain structure. This means that the magnetization is aligned in the same direction at all points of the layer. The magnetization can thus be represented by a single vector M. If a thin layer with uniaxial anisotropy is exposed to an external magnetic field H, whose direction does not coincide with the easy direction, the magnetization of the layer turns. If a layer having a single domain-like structure is involved, it is customary to speak of a coherent rotation of the magnetization. In general, this mode of switching-over the magnetization in thin magnetic layers is referred to as rotational switching.

The direction the magnetization vector M assumes when an external magnetic field H is supplied, can be determined with the aid of a curve which is called the critical curve in the relevant literature. This critical curve and the procedure for determining the adjustment of the magnetization vector M in the presence of an external field H will be dealt with in detail later.

If the external magnetic field H just mentioned is disconnected again, the previously deflected magnetization vector M returns automatically into the first neighboring stable position of equilibrium, which is characterized by a minimum for the energy. Proceeding from the field-free condition, this is the easy direction.

Without an external magnetic field there are fundamentally two stable positions of equilibrium, or initial positions, i.e. 0° and 180° with respect to the easy direction, which positions are employed to represent a binary ONE and a binary ZERO, respectively.

The rotation of the magnetization of a thin layer having uniaxial anisotropy is extremely rapid when an external magnetic pulse field is supplied; the switching time is of the order of nanoseconds (1 $ns=10^{-9}s$).

It is known that a suggestion has been made to utilize the rotational switching of thin layers for the transmission of binary information from a first (controlling element) to a second (controlled). The process involves deflecting the magnetization vector in the hard direction (or at least approaching the hard direction) and allowing it to fall back in a position which is decided by a control impulse emanating from the controlling element. This control impulse is obtained by deflecting—by the supply of an external field—the magnetization vector of the controlling element out of its easy direction (in which, by virtue of its position, it determines the binary information ONE or ZERO) towards the hard direction. Depending upon whether the magnetization vector of the control element is located, in its initial position, at an angle of 0° or 180° to the easy direction, i.e. whether ONE or ZERO is stored in the element, one obtains an induced positive or negative current impulse in the coupling line between the two elements.

This current impulse generates a magnetic field having a controlling effect on the second element; this influences the switch-back of the magnetization vector which is deflected in the hard direction. According to the polarity of the current impulse, the magnetization vector of the controlled element returns to one of the two possible stable positions in the easy direction and in this way takes over the binary information stored in the first element.

The transmission of binary information employing thin magnetic layers as storage and switching elements has so far only been known for symmetrically coupled transmission devices, for example, shift registers, in which none of the binary information ONE or ZERO is given preference with respect to the other. Hereby, the characteristic of the uniaxial anisotropy of the element is only useful for the switching-over process of the magnetization in the individual elements themselves; the coupling of individual elements is symmetrical, and the existence of a preferred direction in the thin layers is not essential for that. Thus, with respect to the symmetrical coupling properties of the known binary information transfer devices having thin layers with rotational switching, the conditions are similar to those obtaining with information transfer devices having switching elements of bulk magnetic material, e.g. toroids of ferrite material; such devices also exhibit symmetrical coupling properties.

Accordingly, a prime object of this invention is to provide novel devices with asymmetrical coupling properties for transferring binary information from a storage or switching element to a connected, essentially similar storage or switching element.

Another object of this invention is to provide improved shift registers with a direction-dependent preference for the transmission of binary information.

Another object of this invention is to provide novel and improved circuits for the logical connection of binary information.

A further object of the invention is to provide a structure for achieving optimum decoupling between the input and output coupling lines from thin film elements.

Still another object of this invention is to provide improved transfer circuits which achieve the most favorable forward and backward decoupling possible.

A more specific object of the invention is to provide an improved circuit and means for transferring a binary 1 and 0 from element to element alternately, thereby ensuring a regeneration of the information to prevent a possible diminution of the signal energy during the course of the shifting process.

Yet another object of this invention is to provide an improved transfer circuit wherein the stray flux couplings between the driver lines generating an external magnetic field and the input and output lines coupling the individual elements is minimized.

It is a feature of this invention that in the information transfer devices herein proposed an external magnetic field can be produced by means of simple line arrangements and simple pulse waveforms; whereby, by appropriate superposition of the external magnetic fields, by switching-in (or out) only one driver current at any one time is required to transfer information from one element to the next independent of synchronization.

The foregoing and other objects, features and advantages of the invention will be apparent from the following more particular description of preferred embodiments of the invention, as illustrated in the accompanying drawings.

The devices embraced by this invention are intended for the transmission of binary information from a controlling magnetic thin film element having an easy direction for the magnetization to a controlled, essentially similar magnetic thin film element, whereby the binary information ONE or ZERO is determined by the direction of the magnetization, and means are visualized for deflecting at the instant of information transfer the magnetization of the controlling magnetic thin film element from a definite initial position by a first magnetic drive field; in general, the fundamental principle here is to visualize coupling means between the magnetic thin film elements, whose effective signal pick-up range with respect to the controlling magnetic thin film element has a maximum value in a direction located obliquely to the direction of the first magnetic drive field and forms an angle with it which, according to its absolute value, is between 15 and 75 degrees. A deviation from the foregoing values, either towards zero or towards 90°, leads to the loss of essential advantages associated with this invention, and which are documented in the examples.

It is possible, from the following description, and with the aid of the attached drawings which illustrate the method, to achieve realization of the invention involved here, whereby attention is drawn to the fact that the arrangements illustrated merely serve to demonstrate the overall essentials of the invention and that within its scope it is possible to develop a wide range of additional binary information transfer devices founded on the same basic conception.

The drawings illustrate a few prominent design examples concerned with the invention, together with a number of variation possibilities.

The following are illustrated:

FIG. 1. Basic device for the transfer of binary information in accordance with the invention involved here.

FIG. 2. A "critical curve" characterizing the switching behavior of magnetic thin film elements in the preferred mode of employment in this invention.

FIG. 3. An information transfer device design based on simplified geometrical assumptions.

FIG. 4. An auxiliary sketch for the qualitative determination of the induced voltages in the coupling lines, with respect to the switchover direction of the magnetization vector of a magnetic film element.

FIG. 5. An auxiliary sketch for defining the direction of current flow in the coupling lines.

FIGS. 6a and 7a. Change with respect to time of the magnetic flux during the switchover of the magnetization vector with relation to two coupling lines having geometrically different arrangements.

FIGS. 6b and 7b. Characteristic with respect to time of the induction current in two coupling lines having geometrically different arrangements.

FIG. 8. The signal to noise ratio of the induction currents flowing in the coupling lines, with respect to the geometrical arrangement.

FIG. 9. The influence of the resultant magnetic control field during the transfer of information to a controlled magnetic film element; plotted with the aid of the critical curve diagram.

FIGS. 10a to 10d. Various possibilities of arranging driver and coupling lines to compensate any possible stray flux couplings.

FIG. 11. A first design arrangement of a shift register.

FIG. 12. A first switching program for the driving currents for the achievement of a stepwise progressive transfer of information in the shift register shown in FIG. 11.

FIG. 13. A second switching program for the operation of the shift register shown in FIG. 11.

FIG. 14. A second shift register arrangement.

FIG. 15. A switching arrangement of magnetic film elements for the technical realization of the logical connectives of Boolean algebra with two input variables, in particular the conjunction and the disjunction. This arrangement is taken from one of many possibilities.

FIGS. 16 to 19. Various switching programs for the operation of the logical switching arrangement shown in FIG. 15.

FIGS. 20a/f to 23a/f. A number of arrangements for the realization of logical connectives with two input variables.

FIGS. 23a/d to 27a/d. Various configurations for the transfer of information from a controlling to a controlled element, particularly for achieving the negation of a variable.

FIGS. 28a/e to 35a/e. Further arrangement possibilities or coupling configurations for the achievement of logical connectives with two input variables X and Y, particularly the logical functions $X \cdot Y$, $X v Y$, $\overline{X} \cdot \overline{Y}$, $\overline{X} v \overline{Y}$, $X \cdot \overline{Y}$, $X v \overline{Y}$, and $\overline{X} \cdot Y$, $\overline{X} v Y$.

FIG. 36. A two-stage coupling configuration of a logical pyramid which, in relationship to the selected switching program, performs either the AND-OR or the OR-AND connective.

FIGS. 37 to 40. Switching program for the driving currents for operating two-stage coupling configurations.

FIG. 41. A two-stage coupling configuration for the realization of the equivalence and the disvalence (exclusive OR).

FIG. 42. A two-stage coupling configuration which performs the function of a halfadder.

FIGS. 43 and 44. Switching programs for two driver lines for operating two-stage coupling configurations whereby, for the stepwise transmission of information, two superposed drive fields are used in order to achieve a synchronization-independent mode of operation.

FIG. 45. A shift-register arrangement having a synchronization-independent switching program.

FIG. 46. A synchronization-independent switching program for the operation of the shift register illustrated in FIG. 45.

By way of introduction, reference is made to the basic arrangement illustrated in FIG. 1 for the transfer of binary information in accordance with the invention involved here. As an example, this device is shown in a form which is technologically simple to manufacture, e.g. by the evaporation of various layers, one above the other. All the information transfer devices described subsequently, such as shift registers and logical circuits are based on the fundamental arrangement shown in FIG. 1.

On a substrate, for example of glass, there is a conducting metal film 1, which can be of silver, copper, aluminum or any other electrically conducting material. Over this, there is a thin layer of insulating material, this is deposited (for example) by the evaporation of silicon monoxide. Such layers of insulation must naturally also be provided between the evaporated conducting layers of the transfer device; in the remainder of this description it is taken for granted that they are provided, and no special reference will be made to them, either in the text or in the drawings.

Two switching elements, 2 and 3, of thin magnetic layers with uniaxial anisotropy are located on the metal film 1 and separated from it by an insulating layer. Each of these elements has a preferred direction of magnetization. Their easy direction is designated by E.

The two elements 2 and 3 are coupled inductively by means of a strip-line type coupling 4. This coupling 4 is situated above elements 2 and 3 and is separated from them by a thin layer of insulation. Two ends, 5 and 6, of the strip-line type coupling 4 are connected conductively with the metal film 1, so as to form—in conjunction with metal film 1—a coupling loop for the elements 2 and 3.

Uppermost on the device, a strip-type driver line 7 and a strip-type driver line 8 are provided; which are also separated from coupling 4 situated underneath by an insulating layer.

If an electric current is passed through a driver line, a magnetic field H builds up; its field lines are perpendicular to the direction of the current, i.e. vertical to an axis R of the driver line. The direction of the magnetic field H with respect to the direction of the current is determined by means of the corkscrew rule.

This magnetic field H influences the switching element 2 or 3 within its range of influence and situated beneath the driver line, and causes a rotation of the magnetization, i.e. of magnetization vector M which, without magnetic field H is in the easy direction E, in the direction of the external field H.

The resulting deviation of the magnetization vector M under the influence of the external field H is now explained with the aid of a critical curve 10 illustrated in FIG. 2.

The critical curve 10 describes an astroid, which, mathematically is further described by an equation $$H_x^{2/3} + H_y^{2/3} = H_k^{2/3} \qquad (1)$$

In this equation, $H_x$ and $H_y$ are the components of the magnetic field H in the easy or in the hard direction, and $H_k$ the anisotropy field strength. With the critical curve it is possible to determine the position of equilibrium of the magnetization of a thin magnetic layer with single domain behavior.

Based on an energetic point of view, the direction of magnetization will now be determined for the static case, when the influence of an external magnetic field H is added to the effect of the uniaxial anisotropy.

The uniaxial anisotropy energy $E_k$ needed to deflect the magnetization by an angle O from the easy direction, is determined by the relationship $$E = K \cdot \sin^2 O \qquad (2)$$

whereby K refers to the anisotropy constant. Without any additional amounts of energy, the requirement for minimum energy leads to angles $O=0°$ or $O=180°$ for the position of the magnetization vector M. This corresponds to the two possible stable positions 0° and 180° of the magnetization vector M in the easy direction when there is no external magnetic field.

However, there is an additional energy term, when an external field H is present in the plane of the layer:

$$E_H = -H_x M \cos O - H_y M \sin O \qquad (3)$$

in which M represents the amount of magnetization, O the angle between the magnetization vector and the easy direction, $H_x$ and $H_y$ the components of the external field in the easy and hard direction.

The requirement for the minimum of the total energy $$E = E_k + E_H \qquad (4)$$

is calculated from the derivative with respect to the angle O:

$$\frac{dE}{dO} = \frac{d(E_k + E_H)}{dO} = 0 \qquad (5)$$

Evaluating Equation 5 and using Equations 2 and 3 we obtain:

$$\frac{H_y}{\sin O} - \frac{H_x}{\cos O} = \frac{2K}{M} = H_k \qquad (6)$$

The quantity $$H_k = \frac{2K}{M}$$

is usually called the anisotropy field strength. For the thin magnetic films in use today, $H_k$ is of the order of magnitude of 5 oersteds.

For a given angle O the Equation 6 represents a straight line in the $H_x/H_y$ plane. For a straight line 11 in FIG. 2, for example, the angle $O_1$ is 30° and Equation 6 becomes:

$$H_x - \sqrt{3} = H_y + \frac{\sqrt{3}}{2} H_k = 0 \qquad (7)$$

This straight line 11 intersects the $H_y$=axis at 0, $5H_k$, the $H_x$=axis at $-0, 865H_k$. Every point ($H_x$; $H_y$) on the line represents an externally supplied magnetic field H, with the components $H_x$ and $H_y$ in the easy and hard direction, respectively, for which the magnetization vector M of the layer adjusts itself under the same angle O with respect to the easy direction, provided (as will be demonstrated below) there is a steady state of equilibrium. Since the slope of this line is $tg$ O this allows to graphically construct the deviation of the magnetization vector. For every straight line defined by Equation 6 there are two energetic states of equilibrium: a stable and an unstable state. They differ by the value of the second derivative of Equation 4 according to the angle O. The energetic stable state of equilibrium is determined by:

$$\frac{d^2E}{dO^2} > 0 \qquad (8)$$

and the energetic unstable state of equilibrium by:

$$\frac{d^2E}{dO^2} < 0 \qquad (9)$$

There is a critical point between the two states; this is established by equating the second derivative to zero:

$$\frac{d^2E}{dO^2}=0 \qquad (10)$$

Geometrically, this means that the stable state of equilibrium is represented by that part of the curve which commences at the critical point and has a point of intersection with the vertical coordinate axis $H_x=0$. The second derivative of Equation 4 with respect to the angle O is as follows:

$$\frac{d^2E}{dO^2}=M[(H_x\cos O+H_y\sin O)+H_k(\cos^2 O-\sin^2 O)] \qquad (11)$$

For the previously selected example the critical point can be evaluated on curve 11, which was determined from Equation 7, when the second derivative 11 is taken as the second determining equation, is equated to zero and $O_1$ is made to equal 30°. The relationship $$\sqrt{3}H_x+H_y+H_k=0 \qquad (12)$$

is then obtained. Calculated from the Equations 7 and 12, the coordinates for the critical point for the chosen example $O_1=30°$ are:

$$H_x=-0,65H_k$$
$$H_y=+0,125H_k \qquad (13)$$

This point lies on the critical curve 10 and characterizes the point of transition from the stable to the unstable energetic state of equilibrium for a definite external field H or its components $H_x$ and $H_y$ (13).

In general, the critical curve 10 is the geometrical location of all critical points for any angle O. The determining Equation 1 for the critical curve can be determined from the Equations 6 and 11, with the latter equated to zero, provided the angle O is eliminated from them both. From the theory of envelopes it can be proved, finally, that every equilibrium curve furnished by the determining Equation 6 represents a tangent on the critical curve, intersection being at the critical point.

Thus the direction of the magnetization vector M for a desired magnetic field H can be determined from the critical curve quite generally by plotting the H vector from the origin of the coordinates and drawing from the tip of the H vector the tangent on the critical curve. This tangent characterizes the direction of deviation of the magnetization vector M of the layer, deflected from the easy direction by the supplied external field H.

Observation of the critical curve illustrated in FIG. 2 will show that one or two stable states of equilibrium for M are available, in relationship to the position of the tip of an H vector with respect to the critical curve. If the tip of an H vector 12 is outside the critical curve, it is possible to draw only one tangent 13 on the critical curve, representing a stable energetic balance, so that there is only one stable state of equilibrium for M, which is indicated by its direction. If the tip of an H vector 14 is within the critical curve, it is possible to draw two tangents 15 and 16 on the critical curve, representing stable energetic balance, so that there are two stable states of equilibrium for M, which are indicated by their directions. If, by extending the field, the tip of an H vector extends beyond the critical curve, the second state of equilibrium which existed previously, disappears; this disappearance is accompanied by an instantaneous switching of M into the new direction.

Reference is now made again to FIG. 1 in order to define some geometrical characteristics of the information transfer device. We regard the magnetic thin film element 2 as the controlling element, and the magnetic thin film element 3 as the controlled element. Thus coupling line 4 is an output line for element 2 and an input line for element 3. For a general case, the easy direction E2 of element 2, the easy direction E3 of element 3, the axis R7 of driver line 7, the axis R8 of driver line 8, the axis R4/2 of the output line of element 2 and the axis R4/3 of the input line of element 3, can assume various directions with respect to each other. It is preferable, however, for the axis R7 and R8 of the driver lines 7 and 8 to be parallel. With reference to these axes, the following angles are defined, which are counted positively in a counterclockwise direction.

The angle between the axis of a driver line and the easy direction is identified by $\epsilon$, the angle between the axis of a driver line and the axis of an output line by $\alpha$ and the angle between the axis of a driver line and the axis of an input line by $\beta$. The following angles are therefore encountered in FIG. 1:

$\alpha 7/4$ is the angle between the driver line 7 and coupling line 4, regarded as output line, $\beta 8/4$ is the angle between the driver line 8 and coupling line 4, regarded as input line, $\epsilon 7/2$ is the angle between the driver line 7 and the easy direction of the magnetic thin film element 2, $\epsilon 8/3$ is the angle between the driver line 8 and the easy direction of the magnetic thin film element 3.

For easier understanding and a better overall conception of the conditions covering the transfer of binary information from a first magnetic thin film element to a second, under the influence of various geometrical coupling configurations, reference is made to the FIG. 3 in which a conducting metal layer 11 is provided with magnetic thin film elements 12, 13 and 23 which are insulated therefrom. The elements 12 and 13 are coupled together by a coupling line 14 located above them; the elements 12 and 23 are coupled together by a coupling line 24 located above them which is also electrically insulated from line 14 at the point where it crosses. Fronts 15, 16 and 25, 26 of lines 14 and 24, respectively, are conductively connected with the metal layer 11. Two driver lines 17 and 18 are also provided which are positioned uppermost on the device.

The two following geometrical simplifications are employed: The axes of the driver lines 17 and 18 are parallel; the easy direction E in all three magnetic thin film elements is parallel to the axis of the driver lines, i.e. the following is valid:

$$\epsilon 17/12=\epsilon 18/13=\epsilon 18/23=0°$$

The axes of the couplings 14 and 24 are inclined 45° with respect to the axes of the driver lines 17 and 18, i.e. the following is valid:

$$\alpha 17/14=\beta 18/14=45°$$
$$\alpha 17/24=\beta 18/24=135°$$

The magnetic thin film element 12 behaves as a controlling element; the magnetic thin film elements 13 and 23 are the controlled elements. In the magnetic thin film elements, a stored 1 is defined by a magnetization vector M oriented to the right, and a stored 0 by a magnetization vector oriented to the left. Its position of rest or its initial position coincides with the easy direction.

As an example it is proposed to consider the case of transferring 1 stored in the controlling element 12. In order to achieve this, the first step is to deflect in the hard direction the magnetization vector of the controlled elements 13 and 23 (referred to from now on as M13 and M23) by means of a current flowing through the driver line 18. A driving current oriented towards the right (designated positive by definition) generates with respect to the elements under the driver lines, in accordance with the "corkscrew" rule, a magnetic field which is perpendicular to the axis of the driver line, directed upwards. A driving current oriented towards the left (designated negative by definition) generates a magnetic field perpendicular to the axis of the driver line, directed downwards. For the purpose of this example, it is not important for the controlled elements 13 and 23 whether their magnetization vectors are deflected in the hard direction by a positive or negative driving current. It is preferable for the driving current to be sufficiently high to produce at the location of the magnetic thin film element a magnetic field having a magnitude of approximately $2H_k$, in any case, larger than the anistropy field strength $H_k$.

At the instant when the information should be transferred, a current is supplied to the driver line 17, and this, by virtue of the field which it develops, deflects or switches over the magnetization vector M12 into the hard direction. If this current is positive, M12 is switched upwards, and downwards if it is negative. The case will now be considered in which M12 is switched in an upward direction by a positive driving current. The deflection of M12 brings about a change with respect to time of the magnetic flux $\Phi$ which induces in couplings 14 and 24 a voltage proportional to $-d\Phi/dt$.

With reference to the FIG. 4, it is possible to determine qualitatively the voltage induced in the couplings. A vector 20 is shown which represents the magnetization vector M12 of the controlling element in the 1 position; a vector 21 is shown which represents the magnetization vector after the switchover into the hard direction. During the switchover, the tip of M12 describes a path 22. A vector 27 represents the magnetization component in the initial position (i.e. of vector 20) in the direction perpendicular to the axis R14. A vector 28 represents the magnetization component after the switchover (i.e. of vector 21) in the direction perpendicular to R14. A vector 29, which is obtained by projecting the way of deflection 22 into a direction which is orthogonal with respect to R14, represents the change of magnetic flux due to the switchover. From Lenz's rule it is established that the switchover of M12 from position 20 to 21 induces a voltage having a polarity such that a current is made to flow in coupling 14 in the direction indicated by a vector 30. The amplitude of this induction current is proportional to the length of vector 29.

A vector 31 represents the component of vector 20, and a vector 32 the component of vector 21, in the direction perpendicular to R24. Vectors 33 and 34 characterize the change of the magnetic flux caused by the switchover, i.e. the projection of the way of deflection 22 into a direction which is orthogonal with respect to R24. During the switchover of M12 a relatively small current will flow in coupling 24; it will flow firstly in one, and then in the opposite direction, as designated by further vectors 35 and 36. The amplitude of this induction current is proportional to the length of the vector 33 or 34.

It is desirable to define the direction of current flow. For this purpose, a magnetic thin film element 40 is illustrated quite generally in FIG. 5. Referring to the FIG. 5, E40 designates the easy direction of element 40 and above are two coupling lines, 41 and 42. Commencing from the easy and hard direction, it is possible, in conformity with the geometrical definition, to establish four quadrants I to IV. Accordingly, the coupling lines, oblique to the easy direction, are located either in the quadrants I/III (coupling 41) or in quadrants II/IV (coupling 42). The current flowing in a coupling line shall be defined as positive when it flows from a lower (I or II) to a higher quadrant III or IV; it shall be defined as negative when it flows from a higher to a lower quadrant. Corresponding to these definitions vectors of current flow 43 and 44 designate positive currents, while vectors 45 and 46 represent negative currents.

Reference is again made to the switching processes explained above in connection with FIGS. 3 and 4. According to the definitions introduced here for the direction of current flow, the relatively high induction current flowing in coupling line 14, represented by vector 30, shall be designated by $+I14$, the relatively small induction current flowing in coupling line 24, represented by vectors 35 and 36, shall be designated by $\mp i24$. The characteristics of these induction currents are plotted in FIGS. 6 and 7 with respect to time.

Figure 6A:
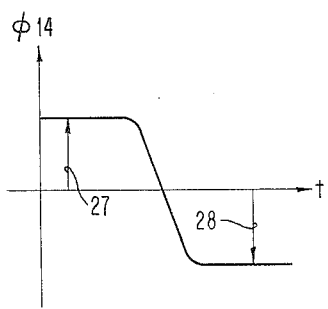
FIG. 6a shows the time diagram of the magnetic flux $\Phi14$ projected in the direction perpendicular to R14, during the switchover of the magnetization vector M12.

of the curve shown in FIG. 6a.

Figure 7A:
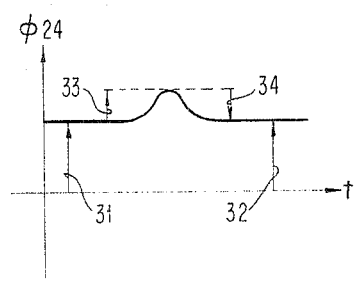

FIG. 7a shows the time diagram of the magnetic flux $\Phi24$ projected in the direction perpendicular to R24, during the switchover of the magnetization vector M12.

Figure 7B:
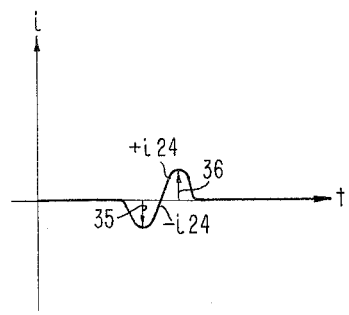

FIG. 7b shows the current $\mp i24$ plotted with respect to time, during the switchover of M12. This curve is proportional to the derivative $$-\frac{d(\Phi24)}{dt}$$

of the curve shown in FIG. 7a.

Similar considerations are valid for the switchover of M12 from the 1 position into the hard direction downwards by a negative driving current. Induction currents $\mp i14$ and $\mp I24$ are then encountered.

If M12 is deflected from the 0 position into the hard direction upwards by a positive driving current, the induction currents $\pm i14$ and $-I24$ flow.

If M12 is deflected from the 0 position into the hard direction downwards by a negative driving current, the induction currents $-I14$ and $\pm i24$ flow.

All the possibilities which can be encountered are assembled in the two following tables, whereby the position of the output coupling lines is designated by the quadrant symbols.

TABLE 1

| For the output coupling line I/III | Initial position of the controlling element | |
|---|---|---|
| | 0 | 1 |
| POSITIVE driving current | $\pm i$ | $+I$ |
| NEGATIVE driving current | $-I$ | $\mp i$ |

TABLE 2

| For the output coupling line II/IV | Initial position of the controlling element | |
|---|---|---|
| | 0 | 1 |
| POSITIVE driving current | $-I$ | $\mp i$ |
| NEGATIVE driving current | $\pm i$ | $+I$ |

This comparison in table form shows that it is possible, starting from a controlling element, to achieve a direction dependent preference of the transmission of the binary information ONE and ZERO solely by the geometrical arrangement of the output coupling, quite regardless of whether a positive or negative driving current is employed.

Figure 3:
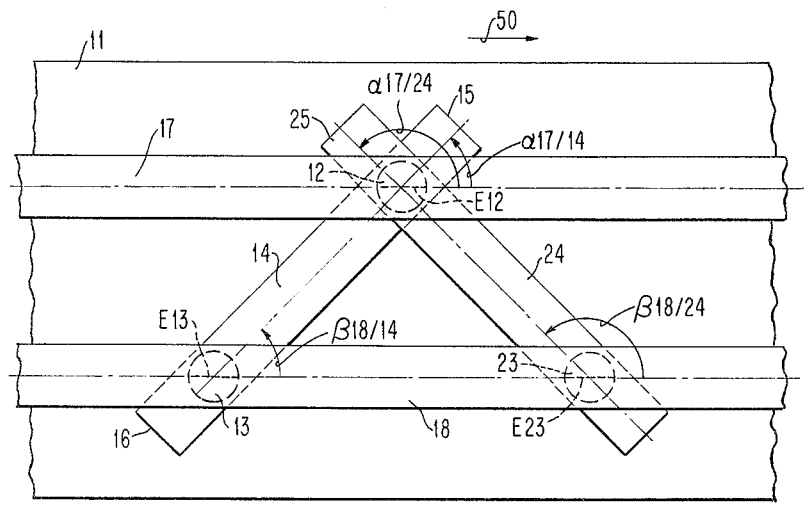
Figure 4:
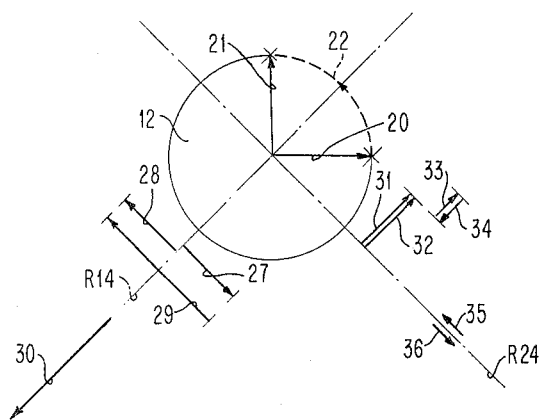
Figure 5:
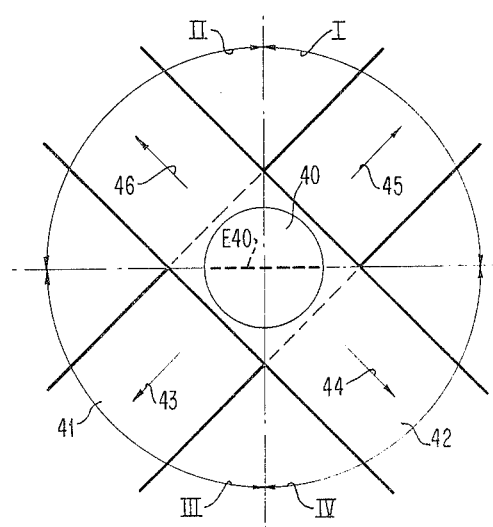

If a controlled element is observed, for instance, the magnetic thin film element 13 in FIG. 3, it will be recognized that a positive controlling current (induction current) $+I14$ produces a magnetic field which endeavors to return to the 1 position the magnetization vector M13 which is deflected into the hard direction (regardless of whether upwards or downwards). A negative current $-I14$ produces a magnetic control field with respect to the magnetic thin film element 13 which endeavors to return to the 0 position the magnetization vector M13 which is deflected into the hard direction.

The same conditions also apply to the controlled magnetic thin film element 23: A positive control current +I24 endeavors to return to the 1 position the magnetization vector M23 which is deflected into the hard direction; a negative control current −I24 endeavors to return it to the 0 position.

All the possibilities which can be encountered in connection with a controlled element—similar to the foregoing—are assembled in the two following tables, whereby the position of the input coupling lines is again designated by the quadrant symbols.

TABLE 3

| For input coupling line I/III | Control current | |
|---|---|---|
| | −1 | +1 |
| POSITIVE driving current | Towards 0 | Towards 1 |
| NEGATIVE driving current | Towards 0 | Towards 1 |

TABLE 4

| For input coupling line II/IV | Control current | |
|---|---|---|
| | −1 | +1 |
| POSITIVE driving current | Towards 0 | Towards 1 |
| NEGATIVE driving current | Towards 0 | Towards 1 |

In the example selected in FIG. 3, in which the coupling lines are arranged obliquely at 45° to the driving lines and the easy direction is parallel to the driver lines, the ratio of the induction current amplitudes $$I:i = \frac{\sqrt{2}}{1-\sqrt{0.5}} = 4.83$$

The device for the transmission of binary information, according to the invention, makes use of the fact that the difference between the induction current amplitudes (I and $i$) is relatively large. An effective transfer of information takes place solely by means of a high induction current I. The small induction current $i$ does not play any part in the transfer of information. Instead, provision is made for the magnetization vector of the controlled element to return automatically to a well-defined position (0 or 1) after deflection into the hard direction, in case there is no control current, or only the small induction current $i$, which is then regarded as a disturbance or noise current.

In order unambiguously to ensure this defined return, it is admissible in principle to adopt two measures which are equally efficacious.

Firstly, one can maintain parallel to the easy direction a constant (possibly also capable of switchover) effective magnetic field (or a corresponding field component) e.g. for the entire information transfer device (at least for the controlled elements) (case 1).

Table 5 lists four possibilities for returning the magnetization vector to a defined end position in case the induction current $i$ is so small that it cannot exert any influence on the direction of return.

TABLE 5

| Return of M without control field | Field component in the easy direction, towards the | |
|---|---|---|
| | RIGHT | LEFT |
| POSITIVE driving current | Towards 1 | Towards 0 |
| NEGATIVE driving current | Towards 1 | Towards 0 |

For this purpose (for example) the earth's magnetic field is suitable, whose vertical component (say in Zurich) is 0.441 oersted. There are approximately about one-tenth of the anisotropy field strength $H_k$ of the magnetic thin films customary today; therefore an absolutely acceptable magnitude.

Secondly, one can visualize a small positive or negative angle $\epsilon$ between the easy direction and the axis of the driver line (case 2).

Again, there are also four possibilities (which are listed in Table 6) for returning M to a defined end position in case the induction current $i$ is so small that it cannot exert any influence on the return direction.

TABLE 6

| Return of M without control field | Angle of incidence+$\epsilon$ | Angle of incidence−$\epsilon$ |
|---|---|---|
| POSITIVE driving current | Towards 1 | Towards 0 |
| NEGATIVE driving current | Towards 0 | Towards 1 |

(Angle numeration positive in counter-clockwise direction)

Related to the area around the point $H_y = H_k$ of the critical curve (see FIG. 2), an angle of approximately $$\epsilon \approx \frac{360°}{2\pi} \cdot \frac{0.1 H_k}{H_k} = 5.7°$$

corresponds effectively to a constant field component of the order of magnitude of the earth's field (about $0.1 H_k$).

If, in order to ensure a defined return of M, one of the measures just discussed is adopted, it is advisable to select the angle of the output coupling symmetrically (and thus most favorably) with respect to the variation of the magnetic flux when switching over M.

The general optimum angles $\alpha_{opt}$ for the output coupling lines I/III and II/IV for the two cases discussed are assembled in Table 7.

TABLE 7

| | $\alpha$I/III$_{opt}$ | $\alpha$II/IV$_{opt}$ |
|---|---|---|
| Case 1 | ½$\psi$ | 90°+½$\psi$ |
| Case 2 | ½($\psi$+$\epsilon$) | 90°+½($\psi$+$\epsilon$) |

Here $\psi$ refers to the angle of deflection of the magnetization vector M with respect to the axis of the driver line. This angle is best determined geometrically by means of the already known tangent construction with the critical curve.

Making simplifying assumptions (i.e. small angle $\epsilon$ and drive field about $2H_k$) the angle of deflection in case 2 is approximately $\psi \approx 90° - \epsilon$, and for the most favorably adapted angle for the output coupling lines we obtain the values $$\alpha I/III_{opt} = 45° \text{ or } \alpha II/IV_{opt} = 135°$$

An additional constant filed component in the easy direction (case 1), or an inclination in the easy direction with respect to the axis of the driver line (case 2) influences the induction current ratio $I:i$ which, from the point of view of information transfer, can be regarded as signal to noise ratio.

Figure 1:
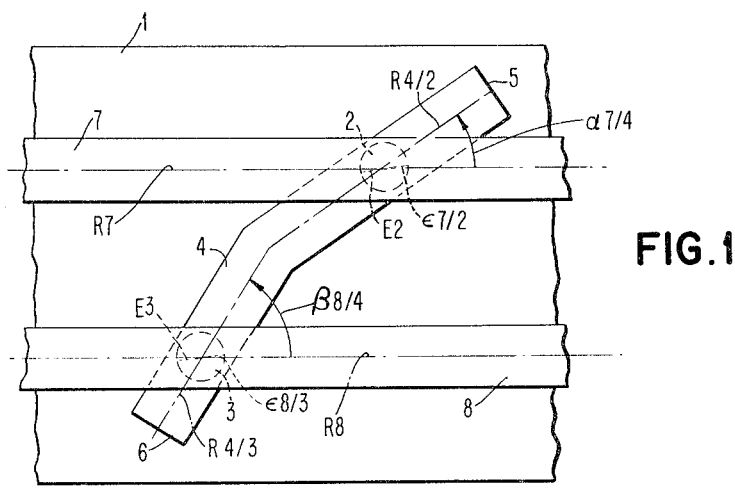
Figure 2:
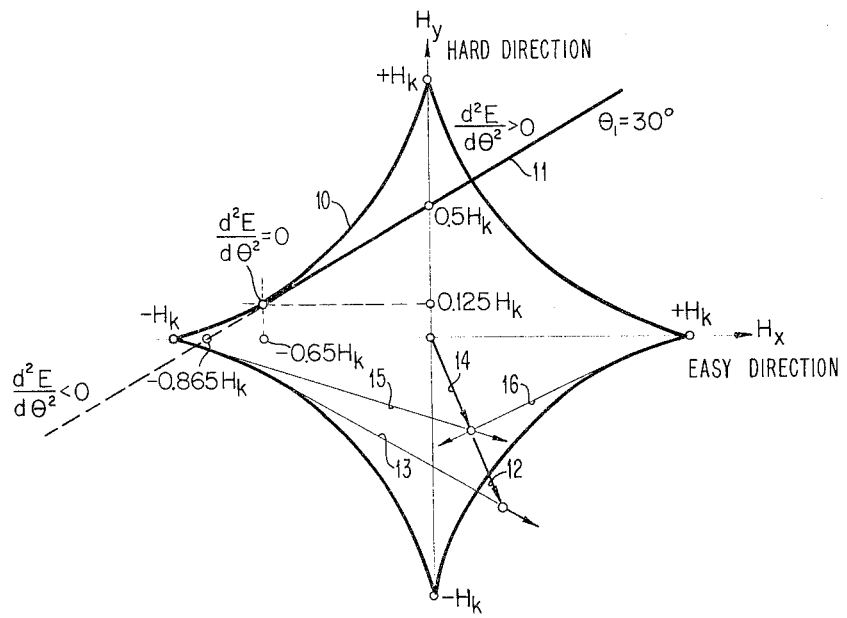
Figure 8:
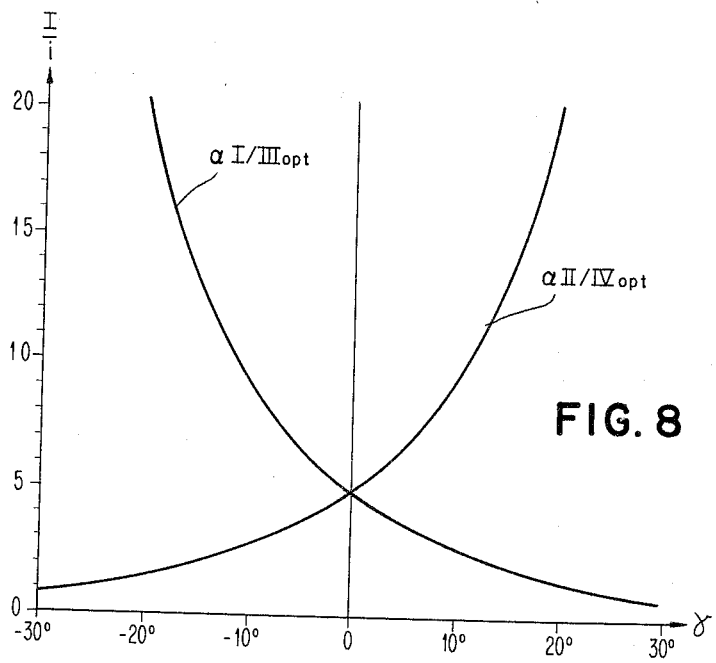

FIG. 8 shows graphically the signal to noise ratio $I:i$ as the function of an angle $\gamma$ for the most favorable adaption of the output coupling angle. In FIG. 2 the approximation $\gamma \approx \epsilon$ is valid within the framework of the already mentioned simplifying assumptions (for small angles $+10° > \epsilon > -10°$ and for a drive field of approximately $2H_k$). Generally, $\gamma$ is defined by the relationship $$\gamma = 45° - \tfrac{1}{2}(\psi - \epsilon) \qquad (14)$$

This latter relationship also applied to case 1 when $\epsilon$ is made to equal 0.

It is now proposed to consider the actual transmission conditions obtaining during the transmission of binary information i.e. ZERO or ONE, from a first (controlling) to a second (controlled) magnetic thin film element. Reference is again made to FIG. 3, and the information will be transferred from element 12 to element 23. As already discussed, in order to ensure unambiguous transmission conditions, an additional constant field component of about 0.1Hg is assumed, in the easy direction to the right (case 1); this is represented graphically in FIG. 3 by the vector 50.

For element 12 as well as for element 23 the drive field for the deflection of the magnetization vector may have a value of approximately $2H_k$. For the fields taken as a basis here the angle of deflection is then $\psi \approx 84, 3°$; this is determined by means of the known tangent construction. From this, according to Table 7, we obtain $$\alpha 17/24_{opt} = 132, 15°$$

as an optimum value for an output coupling II/IV.

The angle $\beta 18/24$ is equal to the angle $\alpha 17/24$. With $\psi = 84, 3°$ one determines from Equation 14 and FIG. 8 the signal to noise ratio $I:i \approx 5.7$.

Before the transmission, M23 is deflected downwards by a negative current in the driver line 18; as was assumed above, this current produces a driving field of approximately $-2H_k$.

The transmission of a ZERO

In this case the magnetization vector M12 of the controlling element is located in the 0 initial position before the transmission, i.e. it is in the easy direction and points to the left.

At this instant, when the transmission of information should take place, a positive current is supplied to the driver line 17, whose driving field deflects the magnetization vector M12 upwards. According to Table 2, this deflection results in an induction current $-I$ in the coupling line 24. At the same instant the negative current in the driver line is switched off. Table 4 shows that a negative induction or control current $-I$ endeavors to switch the magnetization vector M23 to 0. Thus a correct transfer of information is assured.

The transmission of a ONE

In this instance M12 is located in the 1 initial position and is oriented to the right. At the instant when the information is transferred, the magnetization vector M12 is deflected upwards, again by supplying a positive current in the driver line 17. According to Table 2 this deflection results this time in only a small induction current $\mp i$ in the coupling line 24. At the same instant the negative current in the driver line 18 is switched off. Since, as was discussed earlier, a small induction current $i$ does not represent a signal current, but only a disturbance current, which does not influence the return of M23, the direction of the return switch is determined solely by the constant field component in the easy direction. Accordingly, Table 5 shows that M23 returns to the 1 end position. Thus a correct transfer of information is also assured.

Figure 6B:
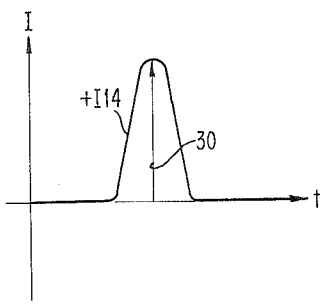
FIG. 6b shows the current $+I14$ plotted with respect to time, during the switchover of the magnetization vector M12. This curve is proportional to the derivative $$-\frac{d(\Phi14)}{dt}$$
Figure 9:
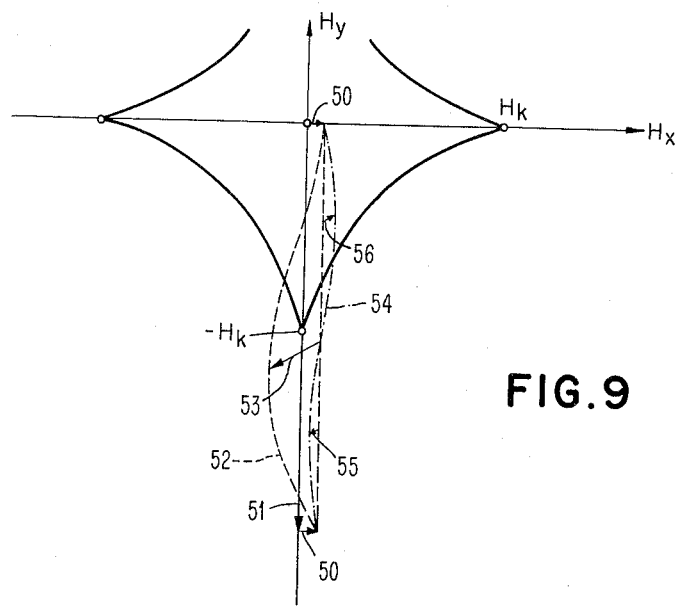

With the aid of the critical curve, FIG. 9 shows which resulting field influences the magnetic thin film element 23 during the transmission of information. Therein the vector 50 represents the constant field component $+0.1 H_k$ in the easy direction, and vector 51 the driving field $-2H_k$ resulting from the negative current flowing through the driver line 18. The curve 52 describes the path of the tip of the resulting field vector during the transmission of a ZERO under the influence of the control field (see time diagram FIG. 6b) created by the control current $-I$ through the coupling line 24. The vector 53 designates the direction and maximum value, corresponding to the amplitude $-1$, of the control field. The curve 54 describes the path of the tip of the resulting field vector during the transmission of a ONE under the influence of the disturbance field caused by the small induction or disturbance current $\mp i$ (see time diagram FIG. 7b). The vectors 55 and 56 designate the direction and maximum values corresponding to the amplitudes $\mp i$ of the disturbance field. The maximum value of the control and disturbance field is equal to the signal to noise ratio $I:i$, whose value for these transmission conditions was found to be approximately 5, 7.

The actual transmission of binary information dealt with here is restricted, in effect, to the transmission of ZERO, whereas in the case of a transmission of a ONE the magnetization vector assumes the defined correct end position automatically.

Between the driver lines and the coupling lines of the information transfer devices involved here, there is no complete magnetic decoupling, since with respect to each other they are located at angles which differ by less than 90°. Thus stray flux couplings can be present between the driver and the coupling lines. It can be proved by calculation that their influence is small, it amounts to about one-fiftieth of the useful signal. However, by compensation it is possible to render the influence of these stray flux couplings virtually ineffectual.

A number of arrangement possibilities are available for this purpose, of which, by way of an example, four are illustrated in principle in the FIGS. 10a to 10d. In general, they are based on principle that stray flux coupling voltages of opposite polarity are induced in the coupling at two sections of the line.

Figure 10A:
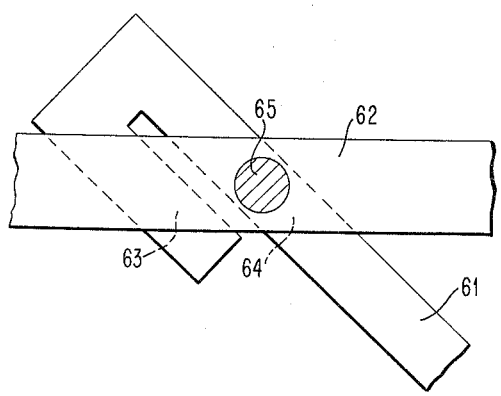

An arrangement is shown in FIG. 10a in which a coupling line 61 is provided which is bent round at the end so as to cross a driver line 62 a second time at the same angle. With a change with respect to time of the current in the driver line, e.g. when switching the current in or out, stray flux coupling voltages of opposite polarity are induced in sections 63 and 64 of the coupling line 61. The signal voltages generated here by switching over the magnetization of a magnetic thin film element 65 are ignored.

Figure 10B:
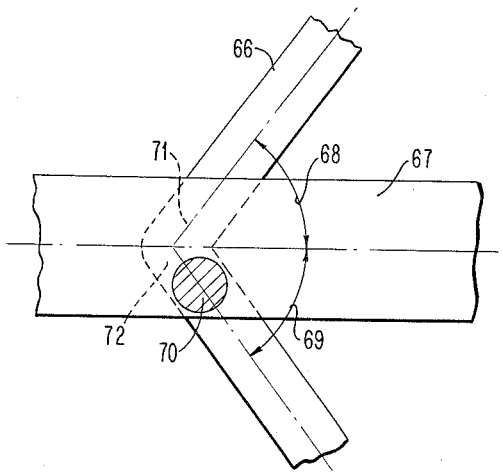

FIG. 10b shows a stray flux compensation device whose bent coupling line 66 is located symmetrically about the axis of a driver line 67, i.e. wherein angles 68 and 69 are the same. A magnetic thin-film element 70 is, for example, in the lower half of the driver line 67. In the event of a change with respect to time in the current in the driver line, stray flux coupling voltages of opposite polarity are induced in sections 71 and 72 of the coupling line 66.

Figure 10C:
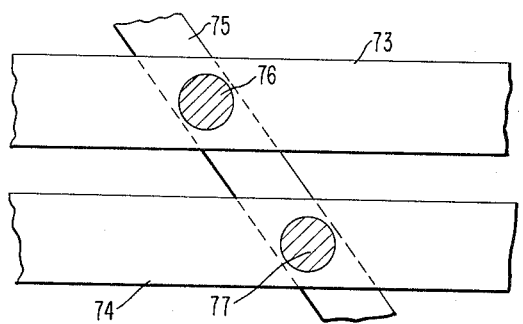

FIG. 10c shows a stray flux compensation device having two driver lines 73 and 74, which are crossed by a coupling line 75 at the same angle. Magnetic thin film elements 76 and 77 are installed under either one or both driver lines. Compensation of the stray flux coupling voltages takes place, for example, whenever a positive current is supplied to (or disconnected from) the first driver line, while a negative current is switched-on to (or switched-off from) the second driver line, or when a positive (negative) current is supplied to the first driver line and a positive (negative) current is switched-off from the second driver line, etc.

FIG. 10d illustrates another stray flux compensation device having two driver lines 78 and 79; in this case a coupling line 80 is bent and crosses the two driver lines so that angles 81 and 82 are the same. Magnetic thin film elements 83 and 84 can be located under either one or both driver lines. Compensation of the stray flux coupling voltages takes place when, for instance, a positive (negative) current is simultaneously supplied to or disconnected from the first and second driver lines, or when a positive (negative) current is supplied to the first driver line and simultaneously a negative (positive) current is disconnected from the second driver line, etc.

Shift register

Proceeding from the foregoing description of the basic device for the transmission of binary information from a first magnetic thin film element to a second magnetic thin film element, and taking into consideration the asymmetrical transmission conditions thereby observed for the binary information ZERO and ONE, it is possible to design various shift register arrangements.

A shift register arrangement is shown in FIG. 11 wherein a number of magnetic thin film elements 101–106 is provided. Since this arrangement of shift register is repeated after six elements, it is necessary only to consider six elements in order to understand the mode of operation. A number of lines 107–112 are arranged above the magnetic thin film elements 101–106, respectively. In the interest of simplicity, only the axes of the coupling lines are drawn. The ends of the coupling lines are connected conductively with a metallic layer, for example, on the baseplate of the device as explained above (not shown in the drawing) which is symbolized by short right-angled lines 113. Three driver lines A, B and C are provided and illustrated with only the axes drawn. As FIG. 11 shows, repeated bending renders the driver line A common to the elements 101, 104, etc., the driver line B common to the elements 102, 105, etc., and the driver line C common to the elements 103, 106, etc. The angle between the coupling lines which cross, i.e. between the input and the output coupling lines are all the same, that is, 90°; this achieves magnetic decoupling between the coupling lines which cross. The angles between the driver lines are all the same, i.e. 45° (or 45°+90°= 135°). In order unambiguously to ensure a defined return of the magnetization vector, an inclination of the easy direction with respect to the driver line axis is visualized for all magnetic thin film elements; this inclination is provided by a small angle $\epsilon \approx -5°$. A negative angle was selected so as to ensure a favorable forward decoupling. The backward decoupling is in any case most favorable on account of the magnetic decoupling between the input and the output coupling lines.

Figure 12:
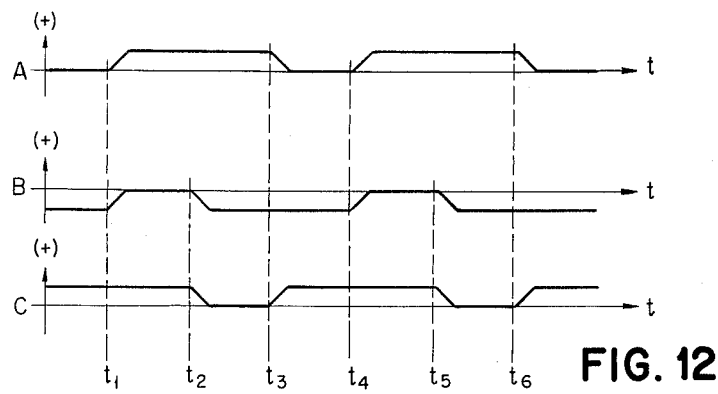

Reference is now made to the current diagram shown in FIG. 12, in which the driving currents in the driver lines A, B and C are plotted with respect to time. The working cycle of the shift register is determined by the switching program of the driving currents. A three-clock register is involved. It should be observed that a current in the driver line A designated in the current diagram as positive influences element 101 like a positive driving current, but influences element 104 like a negative driving current owing to the reversal of the line. Similarly, the negative current in driver line B behaves like a negative driving current towards element 102, but like a positive one towards element 105. The positive current in driver line C affects element 103 like a positive, but element 106 like a negative driving current. Analogously, the same applies to any other elements which are connected in series.

At a time $t_1$ the transfer of information takes place from element 101 to element 102, from element 104 to element 105, etc., or, expressed in general terms: from the group of A elements to the group of B elements. At a time $t_2$ the transfer of information takes place from element 102 to element 103, from element 105 to element 106, etc., or expressed in general terms: from the group of B elements to the group of C elements. At a time $t_3$ the transfer of information takes place from element 103 to element 104, etc., or, expressed in general terms: from the group of C elements to the group of A elements. This cycle proceeds accordingly.

Making use of the switching program (FIG. 12) for the driving currents, the transmission of binary information via a number of stages is analyzed in the following:

When a ZERO is transferred

M101 is located in the 0 initial position at the instant $t_1$. By supplying a positive current in line A, M101 is switched upwards. Accordingly to Table 2 this switchover produces a control current $-I$ in the coupling line 107. At the instant $t_1$, M102 is deflected downwards owing to the negative current in line B. When the negative current in line B is interrupted, and under the influence of control current $-I$, the magnetization vector M102 switches to the 0 end position, in accordance with Table 3. The transfer of the 0 from element 101 to element 102 is thus concluded. M101 does not return to the easy direction until the instant $t_3$, and then it returns to the 0 position; this, however, is not essential.

At the instant $t_2$, M102 is located in the 0 initial position, it is switched downwards by supplying a negative current in line B. According to Table 2, this switchover causes a disturbance current $\pm i$ in the coupling line 108. At the instant $t_2$, M103 is deflected upwards. When the positive current in line C is switched off, M103 switches to the 0 end position, in accordance with Table 6, and this transmission step is concluded.

At instant $t_3$, M103 is located in the 0 initial position; by supplying a positive current to line C, it is switched upwards. As a result, in accordance with Table 2, a control current $-I$ is caused to flow in the coupling line 109. At the instant $t_3$, M104 is deflected downwards, since the positive current in line A influences element 104 like a negative driving current. When the current in line A is switched off, and under the influence of the control current $-I$, M104 switches to the 0 end position, in accordance with Table 3.

At the instant $t_4$, M104 is located in the 0 initial position. By supplying a positive current to line A, which influences element 104 like a negative driving current, M104 is switched downwards. According to Table 2 this procedure results in a disturbance current $\pm i$ in the coupling line 110. At a time $t_4$, M105 is deflected upwards, since the negative current in line B influences element 105 like a positive driving current. When the current in line B is switched off, M105 switches to the 0 end position, in accordance with Table 6.

At a time $t_5$, M105 is located in the 0 initial position. By supplying a negative current to line B, which influences element 105 like a positive driving current, M105 is switched upwards. According to Table 2, this causes a control current $-I$ to flow in the coupling line 111. At the instant $t_5$, M106 is deflected downward, since a positive current in line C behaves like a negative driving current with respect to element 106. When the current in line C is switched off, and under the influence of the control current $-I$, M106 switches to the 0 end position.

The process of transmission can be continued analogously with other elements connected in series.

When a ONE is transferred

M101 is located in the 1 initial position at the instant $t_1$. By supplying a positive current in the line A, M101 is switched upwards. According to Table 2, such a switchover of the magnetization results in a disturbance current $\pm i$ in the coupling line 107. At the instant $t_1$, M102 is deflected downwards. When the negative current in line B is switched off, M102 switches to the 1 end position, in accordance with Table 6.

At the instant $t_2$, M102 is located in the 1 initial position. By supplying a negative current in line B, M102 is switched downwards. According to Table 2, this causes a control current $+I$ to flow in the coupling line 108. At the instant $t_2$, M103 is deflected upwards. When the positive current in line C is switched off, and under the influence of the control current $+I$, M103 switches to the 1 end position, in accordance with Table 3.

At the instant $t_3$, M103 is located in the 1 initial position. By supplying a positive current in line C, M103 is switched upwards. According to Table 2, this results in a disturbance current $\mp i$ in coupling line 109. At the instant $t_3$, M104 is deflected downwards, since the positive current in line A acts like a negative driving current on element M104. When the current in line A is switched off, M104 returns to the 1 end position, in accordance with Table 6.

At the instant $t_4$, M104 is located in the 1 initial position. By supplying a positive current in line A, which influences element 104 like a negative driving current, M104 is switched downwards. According to Table 2, this procedure results in a control current $+I$ in the coupling line 110. At the instant $t_4$, M105 is deflected upwards, since the negative current in line B acts like a positive driving current on the element 105. When the current in line B is switched off, and under the influence of the control current $+I$, M105 switches to the 1 end position in accordance with Table 3.

At the instant $t_5$, M105 is located in the 1 initial position. By supplying a negative current to the line B, which acts like a positive driving current on the element 105, M105 is switched upwards. In accordance with Table 2, this switching procedure results in a disturbance current $\mp i$ in the coupling line 111. At the instant $t_5$, M106 is deflected downwards, since a positive current in line C acts like a negative driving current on the element 106. By switching off the current in line C, M106 is switched to the 1 end position. Thus the transmission of 1 from element 105 to element 106 is concluded.

The process of transmission can be extended analogously to other elements connected in series.

As will be seen from the foregoing analysis of the individual steps of the information transmission, an effective transmission takes place alternately. In effect, the 0 is transmitted from element 101 to 102, the 1 from element 102 to 103, the 0 again from element 103 to 104, etc. In the intermediate steps, the magnetization vector of the elements taking part in the transfer of information switches back—automatically, as it were—to an end position which designates correctly the information to be transmitted; this is achieved in the present example by selecting a negative angle and choosing the polarity of the driving current impulses accordingly.

A further characteristic of the shift register illustrated in FIG. 11 assures an optimum compensation of any possible stray flux coupling between the driver and the coupling lines, for all transfer steps. The conditions applying to FIG. 10d obtain.

Figure 13:
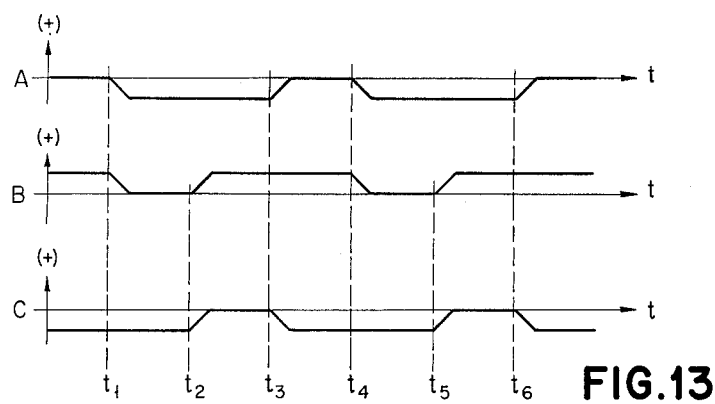

The shift register shown in FIG. 11 also operates correctly when the driving current impulses flowing through the driver lines A, B and C have opposite polarity i.e. when it operates with the switching program shown in FIG. 13. The only difference in the mode of operation caused thereby, consists in the effective transmission of information; with the switching arrangement in accordance with FIG. 13, the 1 is, in effect, transferred from element 101 to 102, and, in effect the 0 from element 102 to element 103 and again, in effect, the 1 from 103 to 104, etc.

Figure 14:
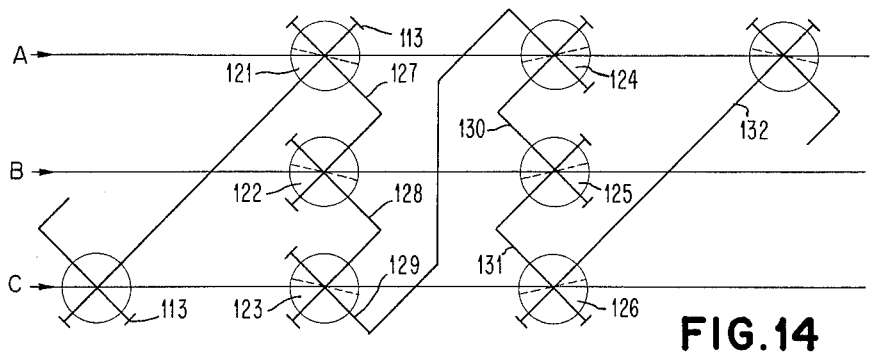

FIG. 14 shows another arrangement of shift register which has a periodicity of six elements. For the observation it is therefore only necessary to consider six magnetic thin film elements 121–126. A number of coupling lines 127–132 also are provided located above the magnetic thin film elements. Uppermost in the device are envisaged three driver lines A B and C. In the interest of clarity, only the axes of the coupling and driver lines are drawn. The ends of the coupling lines are connected conductively with a metallic layer, for example, the baseplate of the device (not shown in the drawing); this is symbolized—as previously—by the short right-angled lines 113. As FIG. 14 shows, the driver line A is common to the elements 121, 124, etc., the driver line B is common to the elements 122, 125, etc., and driver line C is common to the elements 123, 126, etc. The angles between the converging coupling lines are all 90°, whereby a magnetic decoupling of the input and output coupling lines is assured. The angles between the driver lines and the coupling lines are all 45° or 135°. In order unambiguously to ensure a defined return of the magnetization vector, an inclination of the easy direction with respect to the driver line is visualized for all the magnetic thin film elements. In the case of elements 121, 122, 123 this angle is negative approximately $\epsilon \approx -5°$, and for the elements 124, 125, 126, on the other hand, positive approximately $\epsilon \approx +5°$. Favorable forward decoupling is achieved with this kind of arrangement. Optimum backward decoupling is obtained owing to the magnetic decoupling between the input and output coupling lines.

The shift register depicted in FIG. 14 can be operated either with the switching program for the driving current shown in FIG. 12 or with that shown in FIG. 13. If operation with driver currents in accordance with FIG. 12 is selected the coupling lines 127, 129, 131, etc. perform an effective transmission of the 0, while the coupling lines 128, 130, 132, etc. perform an effective transmission of 1. If operation with driver currents, in accordance with FIG. 13, is selected, the foregoing is reversed. This shift register has therefore also the characteristics of an alternating effective transmission of the binary information. As in the previous example, optimum compensation of possible stray flux couplings between the driver and the coupling lines is also assured in the shift register illustrated in FIG. 14. The conditions obtaining are those applying to FIGS. 10c and 10d.

Observation of the switching program depicted in FIG. 12 (or FIG. 13) will show that at the instant $t_1$ (or $t_4$, $t_7$, $t_{10}$, etc.) information is transferred from element 121 to element 122, from element 124 to element 125, etc., or generally from the group of A elements to the group of B elements. At the instant $t_2$ (or $t_5$, $t_8$, $t_{11}$, etc.) information is transferred from the group of B elements to the group of C elements. At the instant $t_3$ (or at the instant $t_6$, $t_9$, $t_{12}$, etc.) the information is transferred from the group of C elements to the group of A elements, etc. In view of the fact that the previous example contained an accurate analysis of each step of the transmission of information, it is not proposed to repeat such an analysis for FIG. 14.

Analyses such as these are most advantageously carried out with the aid of the Tables 1, 2, 3, 4, or 6.

Logical circuits

Proceeding from the already described basic arrangements for the transmission of binary information from a first magnetic thin film element to a second magnetic film element, and taking into consideration the attainable asymmetrical transmission conditions for the binary information ZERO and ONE, it is possible to design various arrangements of logical circuits, a few examples of which will now be described.

Logical circuits conduce to the technical realization of logical connectives of Boolean algebra. With this arrangement two or several switching elements from a first group of switching elements control one or several series-connected switching elements from a second group of elements; this is carried out in such a way that after the process of transmission, binary information is stored in the controlled elements, which represents a defined, logical function of two or several variables stored in the controlling switching elements.

Figure 15:
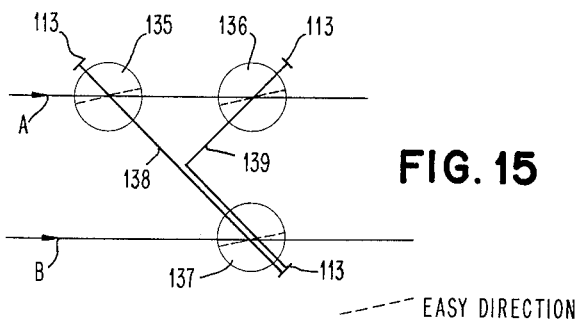

With reference to FIG. 15 it is intended to describe one of a number of possible switching-arrangement variants with magnetic thin film elements. The variables 1 or 0 are stored in the controlling magnetic thin film elements, 135 and 136. A 1 is represented by a magnetization vector oriented to the right, a 0 by one oriented to the left in the easy direction. With respect to the axes of the driver lines A and B, the easy direction is inclined by a small positive angle $+\epsilon$. A controlled magnetic thin film element 137 is coupled with the controlling magnetic thin film element 135 by means of a coupling line 138 and, simultaneously, with the magnetic thin film element 136 by means of a coupling line 139. The coupling lines 138 and 139 are parallel, either next to or above each other, above the magnetic thin film element 137.

At their ends, 113, the coupling lines 138 and 139 are connected with an electrically conducting metal layer (not drawn in the diagram), placed, for example, on a base plate.

Before an instant $t_1$, when the transmission of information should take place, no driving current flows in the driver line A, but a negative driving current flows (from right to left) in driver line B and deflects the magnetization vector downwards. At the instant $t_1$ a positive driving current (flowing from left to right) is supplied to driver line A and at the same time the negative driving current in B is switched off. This switching program for the driving current is illustrated in FIG. 16.

The variable stored in element 135 is designated by X, the variable stored in element 136 by Y and the variable stored in element 137 after the transmission of information, by Z. An analysis of the four possible cases is now furnished.

$X=0$ and $Y=0$

Figure 16:
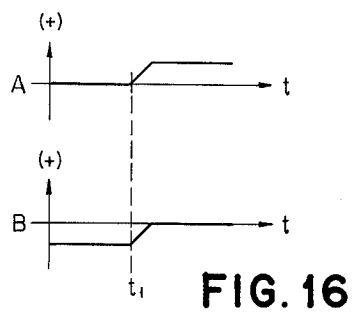

In accordance with the switching program shown in FIG. 16, a positive current is available for the controlling elements. According to Table 2, this positive driving current and the 0 initial position of the controlling element 135 result in an induced control current $-I$ in the coupling line 138. According to Table 1, the positive driving current and the 0 initial position of the controlling element 136 result in an induced disturbance current $\pm i$ in the coupling line 139. Accordingly, only the control current $-I$ flowing in the coupling line 138 has an influence on the controlled element 137; the result is, as Table 4 shows, that the magnetization vector M137, which is deflected downwards by the negative driving current, returns to the 0 end position. Result $Z=0$.

$X=0$ and $Y=1$

As in the foregoing example, a control current $-I$ will flow in the coupling line 138. According to Table 1, the 1 initial position of the controlling element 136 results in an induced current $+I$ in the coupling line 139. With regard to the controlled element 137, the effects of the control currents flowing in the two coupling lines 138 and 139 compensate each other. Since, therefore, there is no control field, the magnetization vector M137, which is deflected downwards by a nega- in accordance with Table 6 owing to the presumed angle of incidence $+\epsilon$ of the easy direction. Result $Z=0$.

$X=1$ and $Y=0$

According to Table 2, the 1 initial position of the controlling element 135 causes a disturbance current $\mp i$ 138; according to Table 1 the 0 initial position of the controlling element 136 causes a disturbance current $\pm i$ 139. These disturbance currents in the coupling lines 138 and 139 have no controlling influence on the magnetic thin film element 137, so that in accordance with Table 6 its downward-deflected magnetization vector M137 returns to the 0 end position. Result $Z=0$.

$X=1$ and $Y=1$

As in the foregoing, a disturbance current $\mp i$ will flow in the coupling line 138. According to Table $i$, the 1 initial position of the controlling element 136 results in an induced control-current $+I$ in the coupling line 139; the effect is, according to Table 4, that the magnetization vector M137 of the controlled element returns to the 1 end position. Result $Z=1$.

The results of the four possibilities analyzed above are assembled in the following table:

TABLE 8

| X·Y | | Y | |
| --- | --- | --- | --- |
| | | 0 | 1 |
| X | 0 | 0 | 0 |
| | 1 | 0 | 1 |

It will be seen from the foregoing that the logical connection according to FIG. 15, based on the switching program of FIG. 16 performs the conjunction (logical AND connective), i.e., $Z=X \cdot Y$.

tive driving current, will return to the 0 end position

In order to simplify the description of the mode of operation of the logical connections of the invention involved here, two terms, "preferred position" and "operating condition" are introduced which are defined as follows:

A *preferred position* for a controlled magnetic thin film element is that end position which the magnetization vector M assumes at an information transmission step, when no influencing control field has effect. The preferred positions 1 and 0 for a controlled element with respect to the driving current and the angle of inclination of the easy direction are already assembled in Table 6.

For the operation of a logical circuit of magnetic thin film elements according to the present invention, it is possible, in essentials, to choose from four *operating conditions*:

Operating condition 1 POSITIVE driving current for controlling element and 0 preferred position for controlled element;

Operating condition 2 NEGATIVE driving current for controlling element and 1 preferred position for the controlled element;

Operating condition 3 POSITIVE driving current for controlling element and 1 preferred position for the controlled element;

Operating condition 4 NEGATIVE driving current for controlling element and 0 preferred position for the controlled element.

It appears advisable, having regard to the following observations to assemble distinctly in a Table 9 the relationship between operating conditions, angle of inclination and the switching programs depicted in the appropriate illustrations.

TABLE 9

Figure 17:
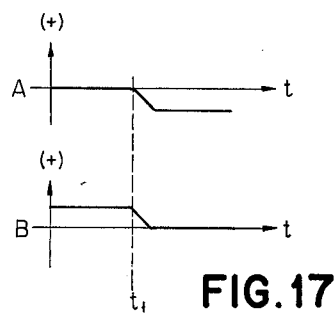
Figure 18:
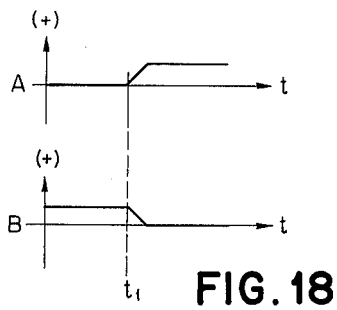
Figure 19:
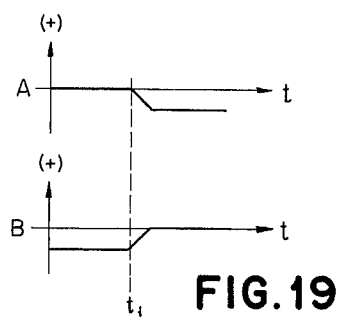
Figure 29A:
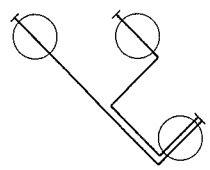
Figure 30A:
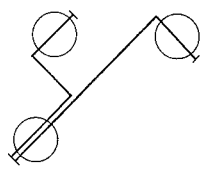
Figure 31A:
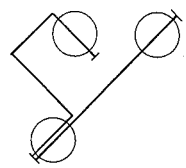
Figure 37:
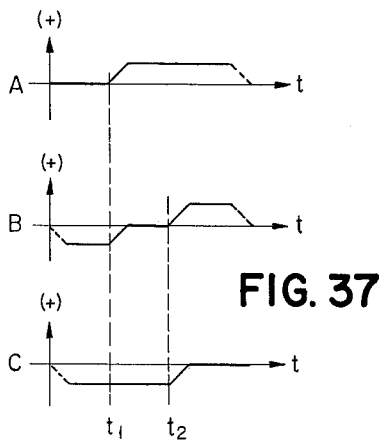
Figure 38:
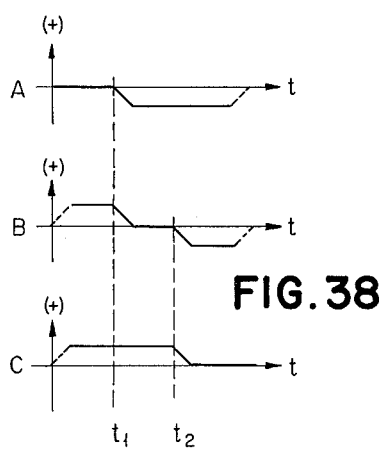
Figure 39:
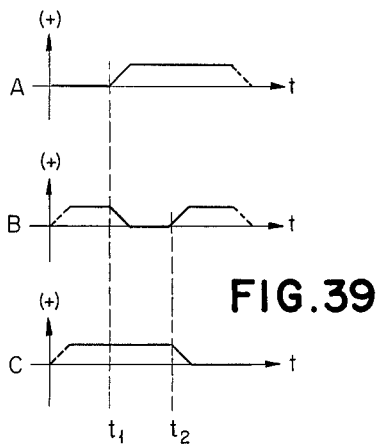
Figure 40:
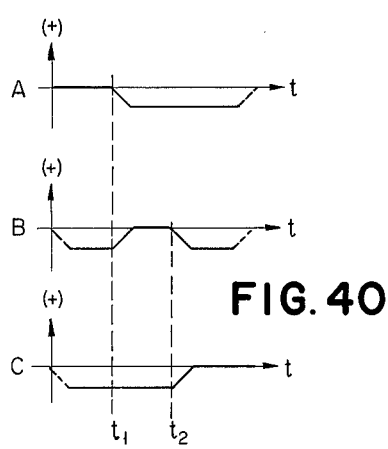

| | Operating condition | | | |
|---|---|---|---|---|
| | (1) | (2) | (3) | (4) |
| Driving current for controlling element.. | POSITIVE | NEGATIVE | POSITIVE | NEGATIVE |
| Preferred position for controlled element. | 0 | 1 | 1 | 0 |
| | Switching program | | | |
| Angle of inclination + $\epsilon$ | Fig. 16<br>Fig. 37 | Fig. 17<br>Fig. 38 | Fig. 18<br>Fig. 39 | Fig. 19<br>Fig. 40 |
| Angle of inclination − $\epsilon$ | Fig. 18<br>Fig. 39 | Fig. 19<br>Fig. 40 | Fig. 16<br>Fig. 37 | Fig. 17<br>Fig. 38 |

In this table, the switching program illustrated in FIGS. 16 to 19 applies for single-stage coupling configurations of logical connections with magnetic thin layer elements, and the program depicted in FIGS. 37 to 40 applies to two-stage coupling configurations.

In accordance with the above definition, the first operational condition was taken as a basis when discussing, as an example in the foregoing, the four cases for the realization of a logical connective with two variables with the aid of the switching arrangement shown in FIG. 15 and in accordance with the switching program of FIG. 16.

When the switching arrangement shown in FIG. 15 is operated with the switching program depicted in FIG. 17, according to which a positive driving current flows in the driver line B, the controlled element 137 has (according to Table 6) a 1 preferred position, because of the assumed angle of incidence +$\epsilon$. With negative driving current in driver line A and a 1 preferred position for the controlled element 137, i.e. when the second operating condition is fulfilled, the logical connection represented in FIG. 15 will perform the disjunction (logical OR connective). This will be confirmed by an analysis similar to the one above.

Based on the third operating condition, i.e. with the switching program shown in FIG. 18, the switching arrangement of FIG. 15 also performs the disjunction.

By applying the fourth operating condition, i.e. with the switching program in accordance with FIG. 19, the switching arrangement shown in FIG. 15 performs the conjunction.

There are numerous similar coupling configurations between two controlling and one controlled magnetic thin film element.

The switching arrangement shown in FIG. 15 is represented symbolically by the coupling configuration FIG. 20a. The configurations FIG. 20 to 20f perform a similar logical connective between two variables. X and Y, i.e. all the connective circuits shown in FIG. 20 are of equal value from the functional point of view. Accordingly, this applies to the other configurations, shown in FIGS. 21 to 35. With this mode of symbolic representation, the two controlling elements are uppermost in each case, and the controlled element beneath. The driver lines, which are not drawn, are horizontal. The variable X is stored in the upper left-hand element, and the variable Y in the upper right-hand element. Fundamentally, it is assumed that a 1 is characterized by the magnetization vector M of a magnetic thin film element which is oriented towards the right, and a 0 by one which is oriented towards the left. By definition, this convention could obviously be reversed.

If it is desired to design an information transfer circuit which should perform a definite logical connective, it is essential to consider two factors: It is first necessary to decide on a coupling configuration between the controlling and the controlled elements, and then on a definite operating condition for operating the designed logical circuit.

The logical functions, which are performed with respect to the operating conditions by the coupling configurations depicted symbolically in FIGS. 20, 21, 22 and 23 (from a to f, as shown), are assmbled in the following table:

TABLE 10

| | Operating condition | | | |
|---|---|---|---|---|
| | (1) | (2) | (3) | (4) |
| Driving current for controlling element. | POSITIVE | NEGATIVE | POSITIVE | NEGATIVE |
| Preferred position for the controlled element | 0 | 1 | 1 | 0 |
| Coupling configuration group: | Performed connective | | | |
| Fig. 20 | X·Y | XvY | XvY | X·Y |
| Fig. 21 | $\overline{X}$·$\overline{Y}$ | $\overline{X}$v$\overline{Y}$ | $\overline{X}$v$\overline{Y}$ | $\overline{X}$·$\overline{Y}$ |
| Fig. 22 | X·$\overline{Y}$ | Xv$\overline{Y}$ | Xv$\overline{Y}$ | X·$\overline{Y}$ |
| Fig. 23 | $\overline{X}$·Y | $\overline{X}$vY | $\overline{X}$vY | $\overline{X}$·Y |

For the sake of completeness, the direct information transfer from a controlling to a controlled element is presented in tabular form. A variable X can either be transferred unchanged, as X, or negated, as $\overline{X}$, to a series-connected element. The possible configurations are represented in FIGS. 24 to 27 (from a to f, as shown). As the following table shows, certain operating conditions are inadmissible for certain configurations; independent of the variables X they always produce the same end condition in the controlled element 0 or 1, respectively.

TABLE 11

|  | Operating condition | | | |
|---|---|---|---|---|
|  | (1) | (2) | (3) | (4) |
| Driving current for controlling element | POSITIVE | NEGATIVE | POSITIVE | NEGATIVE |
| Preferred position for the controlled element | 0 | 1 | 1 | 0 |
|  | Performed connective | | | |
| Coupling configuration group: | | | | |
| Fig. 24 | X | X | 1 | 0 |
| Fig. 25 | $\overline{X}$ | $\overline{X}$ | 1 | 0 |
| Fig. 26 | 0 | 1 | X | X |
| Fig. 27 | 0 | 1 | $\overline{X}$ | $\overline{X}$ |

In connection with the coupling configuration of groups in FIGS. 20 to 23 considered in Table 10 it is possible that, with respect to the controlled element the effect of a control current in the one coupling line is compensated by the effect of a control current in the other coupling line by counter-directional superposition. There is a second group of coupling configurations, however, with which this case does not occur, and instead of which, by means of superposition of the controlled currents in the same direction, a double control effect is achieved with respect to the controlled element. These configurations are shown in FIGS. 28 to 35 (a to e, according to the number). The configuration depends on the dimensioning with respect to the controlled element, and whether an effective control effect is allowed to take place due to the influence of a control current ±I (control effect ±I) or whether an actual control effect is not admitted until the effects of two control currents are superposed in the same sense with respect to the controlled element (control effect ±2I). This dimensioning depends, for instance, on the magnitude of the selected inclination ε of the easy direction or on the magnitude of an existing, constant external field component in the easy direction, or on the damping of the coupling lines; the foregoing includes at least a few of the influencing factors.

The following table shows the logical connectives performed by the coupling configurations of FIGS. 28 to 35 with respect to the operating conditions and with respect to the dimensioning of the control effect.

This table also shows that certain operating conditions are inadmissible for certain coupling configurations, since regardless of the variables X and Y they are the cause of the controlled element always being switched to the same end position 0 or 1, i.e. a logical connective of the variables is not performed.

In the case of the configurations FIGS. 28e to 35e the coupling line branches located over the magnetic thin film elements are connected in the center conductively with each other (designated symbolically in the drawing by a point). In this way one achieves a technologically favorable form of coupling and avoids an arrangement with two coupling lines above each other or parallel as, for instance, in the case of the configurations FIGS. 28a to 35a. As already mentioned, it is the case with configurations FIGS. 28e to 35e, with respect to the controlled element, that two control currents of the magnitude I are superimposed in the same sense. In this instance, the coupling line branch situated above the controlled element takes the entire control current, whereby a pronounced control effect (±2I) is achieved. When only one controlling elements generates a control current ±I, the other only a small disturbance current ±i in the coupling line branch located above, the coupling line branch above the controlled element will take only a part of the control current, since the remainder flows via the parallel branch of the coupling line. For this reason it is preferable to select the control effect ±2I for the coupling configurations 28e to 35e,

TABLE 12

Figure 28A:
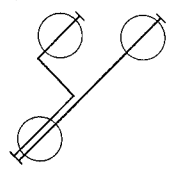
Figure 28B:
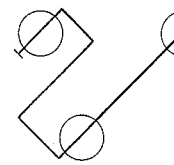
Figure 29B:
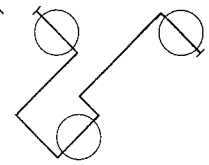
Figure 30B:
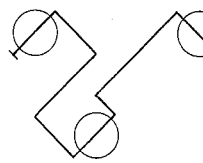
Figure 31B:
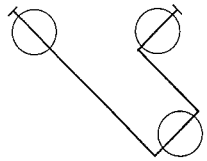
Figure 28C:
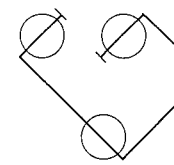
Figure 29C:
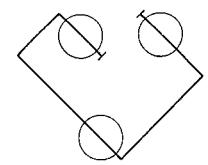
Figure 30C:
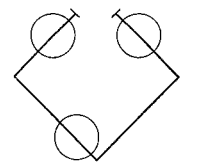
Figure 31C:
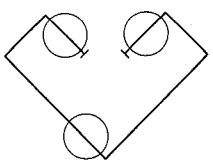
Figure 28D:
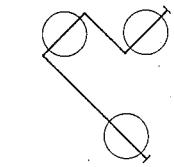
Figure 29D:
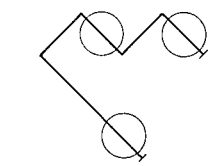
Figure 30D:
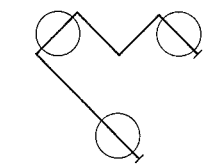
Figure 31D:
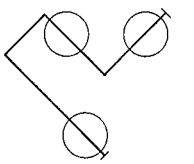
Figure 28E:
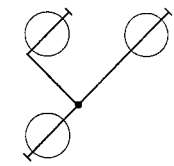
Figure 29E:
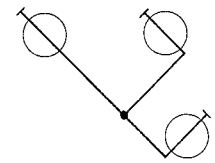
Figure 30E:
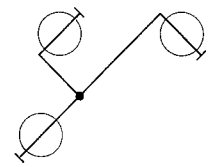
Figure 31E:
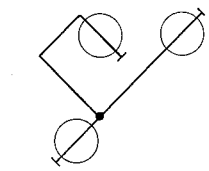

|  | Operating Condition | | | | | | | |
|---|---|---|---|---|---|---|---|---|
|  | (1a) | (1b) | (2a) | (2b) | (3a) | (3b) | (4a) | (4b) |
| Driving current for controlling element | POSITIVE | | NEGATIVE | | POSITIVE | | NEGATIVE | |
| Preferred position for controlled element | 0 | | 1 | | 1 | | 0 | |
| Control effect | ±I | ±2I | ±I | ±2I | ±I | ±2I | ±I | ±2I |
| Coupling configuration group: | Performed connective | | | | | | | |
| Fig. 28 | XvY | X·Y | X·Y | XvY | 1 | 1 | 0 | 0 |
| Fig. 29 | $\overline{X}v\overline{Y}$ | $\overline{X}\cdot\overline{Y}$ | $\overline{X}\cdot\overline{Y}$ | $\overline{X}v\overline{Y}$ | 1 | 1 | 0 | 0 |
| Fig. 30 | $Xv\overline{Y}$ | $X\cdot\overline{Y}$ | $X\cdot\overline{Y}$ | $Xv\overline{Y}$ | 1 | 1 | 0 | 0 |
| Fig. 31 | $\overline{X}vY$ | $\overline{X}\cdot Y$ | $\overline{X}\cdot Y$ | $\overline{X}vY$ | 1 | 1 | 0 | 0 |
| Fig. 32 | 0 | 0 | 1 | 1 | X·Y | XvY | XvY | X·Y |
| Fig. 33 | 0 | 0 | 1 | 1 | $\overline{X}\cdot\overline{Y}$ | $\overline{X}v\overline{Y}$ | $\overline{X}v\overline{Y}$ | $\overline{X}\cdot\overline{Y}$ |
| Fig. 34 | 0 | 0 | 1 | 1 | $X\cdot\overline{Y}$ | $Xv\overline{Y}$ | $Xv\overline{Y}$ | $X\cdot\overline{Y}$ |
| Fig. 35 | 0 | 0 | 1 | 1 | $\overline{X}\cdot Y$ | $\overline{X}vY$ | $\overline{X}vY$ | $\overline{X}\cdot Y$ | while for the series connection of the coupling line, as shown in the configurations FIGS. 28b, c, d to 35b, c, d, a control effect ±I may be convenient.

Figure 36:
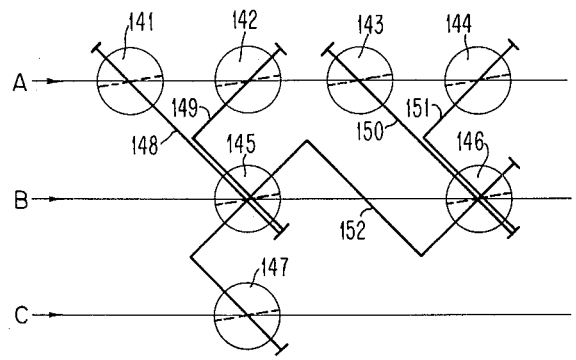

The logical connections observed so far, e.g. the coupling configurations of FIGS. 20 to 35 are single-stage configurations, i.e. the desired logical connective is achieved by a single transmission step. By serial connecting two or several single-stage coupling configurations it is possible to design multistage configurations which perform multiterm logical connectives. By way of an example, FIG. 36 represents a two-stage coupling configuration of a logical pyramid which, in two transmission steps, performs either the AND-OR or the OR-AND connective, with respect to the operating conditions selected. Seven magnetic thin film elements 141–147 are provided. The four variables $X_1$, $X_2$, $X_3$ and $X_4$ are stored in the four magnetic thin film elements 141–144 located uppermost. The elements 141, 142 and 145 are coupled in a configuration corresponding to the manner illustrated in FIG. 20a, by means of the coupling lines 148 and 149. The elements 143, 144 and 146 are provided with coupling lines 150 and 151 corresponding to the coupling configuration FIG. 20a. It will be seen from Table 10, in relation to the selected operating condition, that either the logical connective $X_1 \cdot X_2$ or the logical connective $X_1 v X_2$ is performed following a transmission step with respect to the element 145; that either the logical connective $X_3 \cdot X_4$ or the logical connective $X_3 v X_4$ is performed with respect to the element 146. With their coupling line 152 the elements 145, 146 and 147 forming a coupling configuration corresponding to FIG. 28d. It can be determined from Table 12 which logical connective is performed by this coupling configuration with respect to the selected operating conditions. Based on the operating condition 1a for both transmission steps, i.e. + driving current for the controlling element, 0 preferred position and ±I control effect for the controlled element, the element 147 will represent the logical function $(X_1 \cdot X_2) v (X_3 \cdot X_4)$ after two transmission steps. Based on the operating condition 2a for both transmission steps the two-stage coupling configuration FIG. 36 will perform another logical connective, namely, the function $(X_1 v X_2) \cdot (X_3 v X_4)$.

When, as assumed in FIG. 36, an angle of inclination $+\epsilon$ is envisaged, it is possible to achieve the operating condition 1a by means of the switching program depicted in FIG. 37 for the currents in the three driver lines A, B and C (see Table 9). Under the same conditions (angle of inclination $+\epsilon$), it is possible to fulfill the operating condition 2a with the switching program illustrated in FIG. 38. Assuming a negative angle of inclination $-\epsilon$ for the easy direction of the magnetic thin film elements, it is necessary to make use of the switching program shown in FIG. 39 for the operating condition 1a and that shown in FIG. 40 for the operating condition 2a. In all these cases the transmission of information from elements 141 through 144 to the elements 145 and 146 takes place at the instant $t_1$; and from the elements 145 and 146 to the element 147 at the instant $t_2$.

A further example of a two-stage coupling configuration is represented in FIG. 21 which performs the logical functions equivalence and disvalence (exclusive OR). There are provided five magnetic thin film elements 153–157. The two variables X and Y are stored in the two uppermost magnetic thin film elements 153 and 154. The elements 153, 154 and 155 are coupled together via a coupling line 158 so that a logical connective is achieved corresponding to the coupling configuration group FIG. 20. This can be shown with the aid of FIG. 20d by connecting the coupling line in this configuration to a closed loop, and imagining the same to be carried out with the coupling line 158 in FIG. 41; the resulting line arrangement makes the equality of the coupling configurations apparent. The elements 153, 154 and 156 are coupled together via coupling line 158 in a configuration similar to FIG. 21f. As in the foregoing example, it can be ascertained from Table 10 that based on, say, operating condition 1, after a transmission step, the element 155 represents the logical connective $X \cdot Y$, and that based on, say, operating condition 2, after a transmission step, the element 155 represents the logical connective $X v Y$ and element 156 the logical connective $\overline{X} v \overline{Y}$. The elements 155, 156 and 157 are coupled together via a coupling line 159 in a coupling configuration corresponding to FIG. 28d. Table 12 shows which logical connective is performed, with respect to the selected operating condition, by a circuit belonging to configuration group FIG. 28. Accordingly, based on the operating condition 1a, the element 157 will represent for both transmission steps the logical connective of the equivalence $(X \cdot Y) v (\overline{X} \cdot \overline{Y})$, and based on the operating condition 2a the element 157 will represent for both transmission steps the logical connective of the disvalence, which is equivalent to the exclusive OR $(X \cdot \overline{Y}) v (\overline{X} \cdot Y)$.

Figure 41:
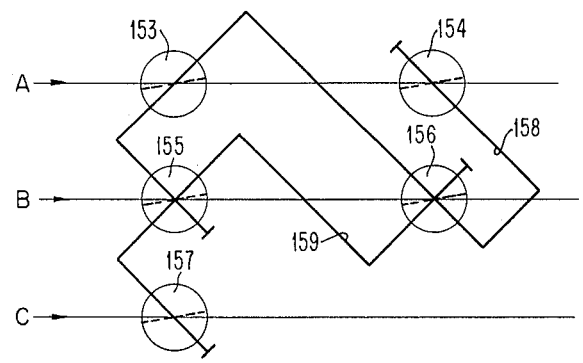

When, as assumed in FIG. 41, a positive angle of inclination $+\epsilon$ is visualized for the easy direction of the magnetic thin film elements 153 to 157, it is possible to realize the operating condition 1a by means of the switching program for the driving currents, shown in FIG. 37 (see Table 9). Assuming the same prerequisite (angle of inclination $+\epsilon$) the operating condition 2a is fulfilled by the switching program depicted in FIG. 38. If a negative angle of inclination $-\epsilon$ were envisaged for the magnetic thin film elements it would be necessary, in order to fulfill the operating condition 1a, to apply the switching program illustrated in FIG. 39, and in order to fulfill the operating condition 2a, to apply the switching program illustrated in FIG. 40.

Figure 42:
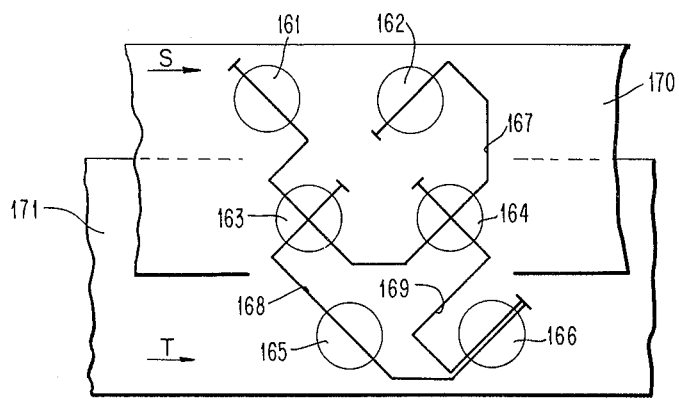

With a two-stage coupling configuration it is possible to realize the logical connection of the half-adder frequently used in the sphere of electronic digital computers and information processing machines. An embodiment of a half-adder having six magnetic thin film elements 161–166 is shown in FIG. 42. The two binary variables $X_1$ and $X_2$ to be added are stored in the two uppermost magnetic thin film elements 161 and 162. The elements 161, 162 and 163 are coupled together via a coupling line 167 so as to achieve a logical connective corresponding to the coupling configuration shown in FIG. 20c. The elements 161, 162 and 164 are coupled together via the same coupling line 167 in a configuration corresponding to FIG. 21c. Table 10 shows that, based on operating condition 1 or 4, following a transmission step the element 163 represents the logical connective $X_1 \cdot X_2$ and element 164 the logical connective $\overline{X}_1 \cdot \overline{X}_2$. Corresponding to the configuration FIG. 24b, a direct information transfer takes place between the elements 163 and 165 via the coupling line 168. Table 11 shows that for a coupling corresponding to the configuration group FIG. 24, an unambiguous transfer of information is assured when either the operating condition 1 or 2 is applied.

Therefore after the second transmission step, the element 165 will represent the information taken from element 163, i.e. the logical connective $X_1 \cdot X_2$ which, as is known from the theory of binary computer circuits, designates the carry of a single-digit binary addition. As is also known, the sum occurring with a single-digit binary addition is represented by the disvalence (exclusive OR), i.e. by the logical function $(X_1 \cdot \overline{X}_2) v (\overline{X}_1 \cdot X_2)$. In order to achieve the storage in element 166 of the disvalence resulting from a logical connective it is efficacious to couple together by a negated disjunction the function $X_1 \cdot X_2$ existing in element 163 after the first transmission step and the information $\overline{X}_1 \cdot \overline{X}_2$ existing in element 164:

$$\overline{(X_1 \cdot X_2) v (\overline{X}_1 \cdot \overline{X}_2)} = \overline{(X_1 \cdot X_2)} \cdot \overline{(\overline{X}_1 \cdot \overline{X}_2)} = (\overline{X}_1 v \overline{X}_2) \cdot (X_1 \cdot X_2) =$$
$$(X_1 \cdot \overline{X}_2) v (\overline{X}_1 \cdot X_2)$$

In FIG. 42 the elements 163, 164 and 166 are coupled together by means of coupling lines 168 and 169 to form a coupling configuration corresponding to the one shown in FIG. 21b. Table 10 shows that the negated disjunction for this coupling configuration is achieved either with the operating condition 1 or 4.

The two-stage coupling configuration shown in FIG. 42 can be operated with any desired switching program such as depicted in FIGS. 37 to 40 in order to perform the function of a half-adder. The prerequisite is that the required operating conditions in accordance with Table 9 are fulfilled by the correct choice of angle of inclination of the easy direction, at least in the case of the elements 163, 164, 165 and 166. The angle of inclination for the elements 161 and 162 is not of decisive importance, it can be positive or negative.

When applying the switching program shown in FIG. 37, the operation condition 1 is fulfilled by the assumption of a positive angle of inclination $+\epsilon$ for the elements 163, 164, 165 and 166. The foregoing analysis demonstrates that the operating condition 1 can be applied for all the information transmissions occurring with FIG. 42.

When applying the switching program illustrated in FIG. 38, the operating conditions 4 and 2 are fulfilled by assuming a negative angle of inclination $-\epsilon$ for the elements 163, 164 and 166, and a positive angle of inclination $+\epsilon$ for the element 165. The foregoing analysis demonstrates that the transmission of information to the elements 163, 164 and 166 is based on the operation condition 4, while operating condition 2 is the basis of information transfer from element 163 to element 165.

When applying the switching program shown in FIG. 39, the operating condition 1 is fulfilled by the assumption of a negative angle of inclination $-\epsilon$ for the elements 163, 164, 165 and 166.

When applying the switching program depicted in FIG. 40, the operating conditions 4 and 2 are fulfilled by the assumption of a positive angle of inclination $+\epsilon$ for the elements 163, 164 and 166, and a negative angle of inclination $-\epsilon$ for the element 165.

*Synchronization-independent switching programs*

Figure 43:
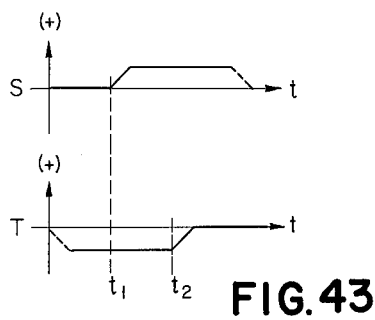

The switching programs shown in FIGS. 37 and 38 are of special significance owing to the characteristic which ensures that the pulse waveform B is maintained by superposition of the pulse waveforms A and C. With this characteristic two driving currents are adequate for a two-stage coupling configuration whereby, preferably, the strip-type driver lines are common to the elements located in the center, so that the magnetic driving fields emanating from the two driving currents are superimposed. FIG. 42 shows the arrangement of the driver lines. A first driver line 170 is provided to conduct a driving current S, and is arranged above the elements 161, 162 and 163, 164. A second driver line 171 is provided to conduct a driving current T, and is arranged above the elements 163, 164, and 165, 166. The switching program corresponding to FIG. 37 for the driving currents S and T is furnished in FIG. 43. By switching-in the driving current S is at the instant $t_1$ the information is transferred from the elements 161, 162 to the elements 163, 164. By disconnecting the driving current T at the instant $t_2$ the information is transferred from the elements 163, 164 to the elements 165, 166. The transfer of information from one element to the next is achieved simply by switching-in or switching-off, respectively, only one driving current at any one time; the operation is thereby independent of synchronization.

Figure 44:
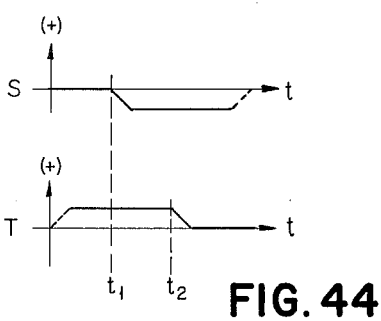

The switching program corresponding to FIG. 28 for the driving currents S and T is furnished in FIG. 44.

It is evident that this principle of superimposing the magnetic driving fields can also be applied to other coupling configuration, e.g. for those shown in FIG. 36 and 41.

Figure 45:
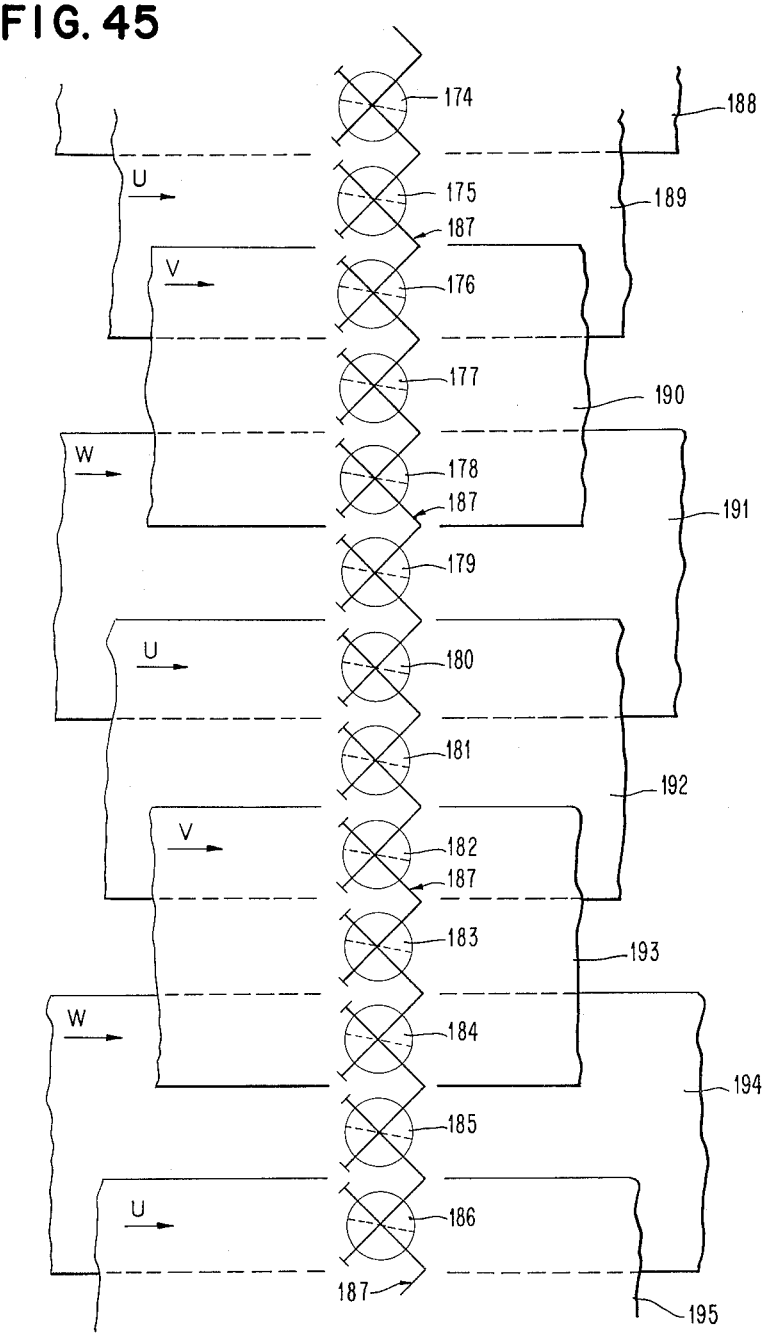
Figure 46:
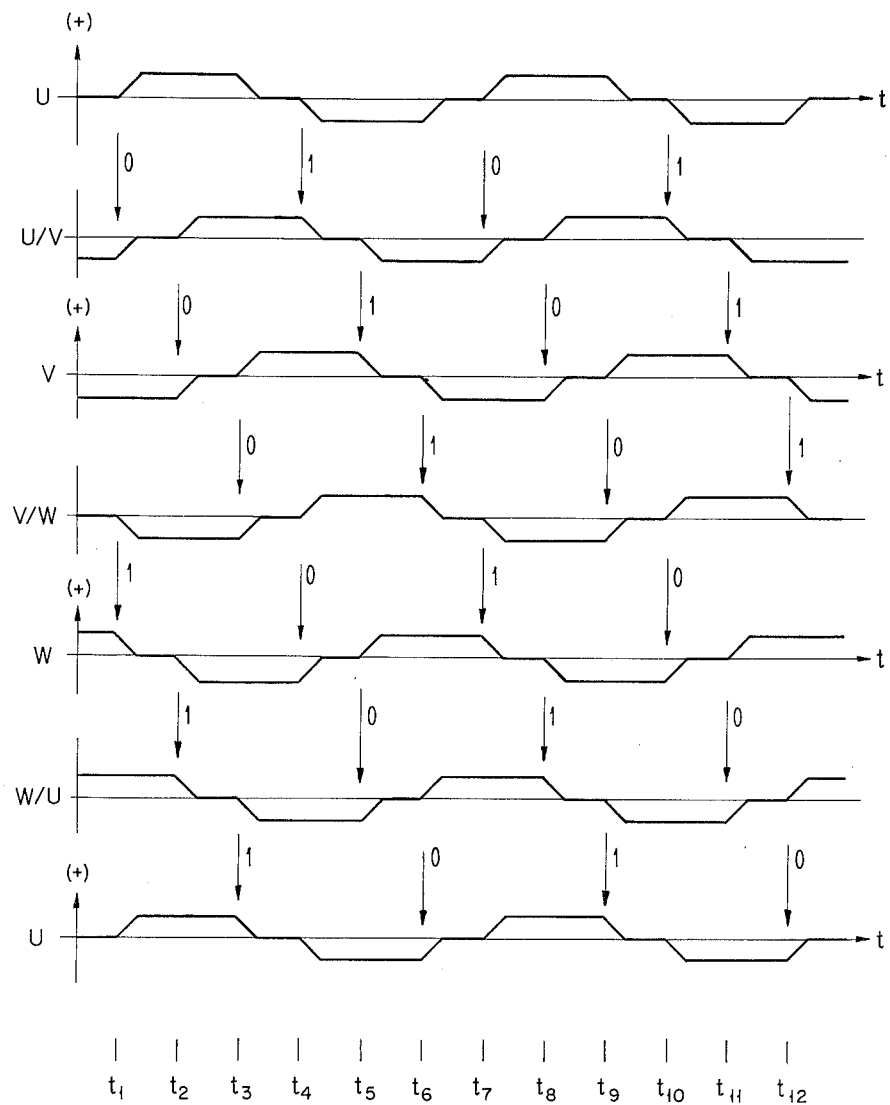

The switching programs shown in FIGS. 16 and 17 can also be rendered independent of synchronization by superposition. In FIG. 16, for instance, one obtains the pulse waveform B by superposing pulse wave form A with a constant negative current having the same amplitude (e.g. magnetic field). Not only logical circuits, but also shift registers lend themselves to the application of synchronization-independent switching programs. By way of an example, a possible shift-register arrangement is illustrated in FIG. 45. With reference to the FIG. 45, an arrangement of magnetic thin film elements 174–186 is provided having coupling lines 187. As may be seen, this arrangement is similar to the design arrangement of the shift register discussed in connection with FIG. 11. A number of driver lines 188–195 are provided, each of which covers three magnetic thin film elements: the driver line 189 covering the elements 174, 175, 176, the driver line 190 covering the elements 176, 177, 178, the driver line 191 covering the elements 178, 179, 180, etc. The driver lines 189, 192, 195, etc. conduct a current U, the driver lines 190, 193, etc. conduct a current V and the driver lines 191, 194, etc. conduct a current W. The switching program for these three currents, U, V and W is shown in FIG. 46. Thus, for element 175, only the current U is effective; for the element 176, the superposition of the currents U and V; for the element 177, only the current V; for the element 178, the superposition of the currents V and W; etc. The FIG. 46 also illustrates the pulse waveforms created by the superposition of the currents, which are effective for the associated elements 176, 178, 180, 182, etc. At the instant $t_1$ a 0 is transferred, in effect, from (for example) element 175 to element 176 by switching-in a positive current U; at the same instant $t_1$ a 1 is transferred, in effect, from element 178 to element 179 by switching-off the positive current W. At the instant $t_2$ a 0 is transferred, in effect, from element 176 to element 177 by switching-off the negative current V; at the same instant $t_2$ a 1 is transferred, in effect, from element 179 to element 180 by switching-in a negative current W. At the instant $t_3$ a 0 is transferred, in effect, from element 177 to element 178 by supplying a positive current U; at the same instant $t_3$ a 1 is transferred, in effect, from element 180 to element 181 by switching-off a positive current U, etc. The transfer of information at the various instants, from one element to the next is depicted symbolically in FIG. 46 by arrows; the binary information effectively transferred is written on the arrows.

While the invention has been particularly shown and described with reference to preferred embodiments thereof, it will be understood by those skilled in the art that various changes in form and details may be made therein without departing from the spirit and scope of the invention.

What is claimed is:

1. In an information transfer circuit, a controlling and a control magnetic thin film element, each said element exhibiting an easy direction of remanent magnetization and a hard direction of magnetization, means applying a field to said controlling element for deflecting the magnetization thereof away from the easy direction, and means coupling both said controlling and control elements whose effective signal pick-up range with respect to the controlling element is a maximum in a direction which is oblique to the direction of said applied field and couples said controlling element at an angle between 15 and 75 degrees with respect to the direction of said applied field.

2. The circuit as set forth in claim 1, wherein said field is applied at an angle between ±15 degrees with respect to the hard direction of said element.

3. The circuit as set forth in claim 2, wherein said coupling means couples said controlling element at an angle between 15 and 75 degrees with respect to the direction of said applied field and wherein said angle of coupling includes an angle $\frac{1}{2}(\psi+\epsilon)$, where $\psi$ is the angle of deflection of the magnetization of said element away from the easy direction thereof and taken with respect to a direction perpendicular to the applied field and $\epsilon$ is the angle of inclination of the hard direction of magnetization of said controlling element with respect to the direction of the applied field.

4. The circuit as set forth in claim 3, wherein said magnetic elements comprise a layer of magnetic material having a thickness between 100 to 1000 A.

5. In a circuit, a controlling and a controlled magnetic thin film element, each said element exhibiting an easy direction of remanent magnetization and a hard direction of magnetization, means coincidently applying a drive field to both said elements away from their respective easy directions, and means coupling both said elements such that the controlling element is coupled at an angle between 15 and 75 degrees with respect to the direction of said applied field whereby the signal pick-up range thereof is a maximum in a direction which is oblique to the direction of the applied field.

6. The circuit as set forth in claim 5, wherein the means coupling said elements comprises a continuous conductor in the form of a thin film which is nonlinear intermediate said elements.

7. The circuit as set forth in claim 5 wherein the means coupling both said elements comprises a continuous conductor in the form of a thin film so arranged with respect to both said elements that stray flux couplings emanating from said elements are induced in at least two areas thereof which couplings are of equal magnitude and opposite polarity.

8. The circuit as set forth in claim 7, wherein said conductor is nonlinear intermediate said elements forming a first angle between the conductor and the field applied to said controlling element and a second angle formed between said conductor and the field applied to said controlled element with said first and second angles complementary to 180°.

9. The circuit as set forth in claim 7, wherein said coupling conductor is located above said elements with the different ends thereof connected to a common line, and the means for applying said fields comprises a first and a second drive conductor in the form of a thin film strip with said first drive conductor located above said controlling element and said second drive conductor located above said controlled element.

10. In an information transfer circuit comprising in combination, a controlling and a controlled magnetic thin film element, each said element exhibiting an easy direction of remanent magnetization and a hard direction of magnetization, said easy and hard directions of magnetization being in quadrature to one another; means coincidently applying a first drive field to said controlling element and a second drive field to said controlled element, both said fields applied at an angle $\epsilon$ with respect to the hard directions of said elements where $\epsilon$ is between $+15$ and $-15$ degrees, for deflecting the magnetization of both said elements away from their respective easy directions by $\psi$ degrees, where $\psi$ is the angle of deflection of the magnetization of said elements upon application of said drive fields away from the respective easy directions of said elements and taken with respect to a direction perpendicular to the different drive fields applied; and means comprising a nonlinear conductor coupling both said elements whose effective signal pickup range with respect to the controlling element is a maximum and control effect with respect to said controlled element is a maximum both taken with respect to a direction oblique to the direction of said applied fields and both being coupled in a direction which is oblique to the direction of the respective drive fields of said elements forming an angle therewith which includes an angle ½ $(\psi+\epsilon)$ and is between 15 and 75 degrees.

References Cited by the Examiner

UNITED STATES PATENTS

| 2,919,432 | 12/1959 | Broadbent | 340—174 |
| 3,151,317 | 9/1964 | Franck | 340—174 |
| 3,154,765 | 10/1965 | Alexander | 340—174 |

FOREIGN PATENTS 845,604   8/1960   Great Britain.

IRVING L. SRAGOW, *Primary Examiner.*

JOHN F. BURNS, *Examiner.*